(12) United States Patent
Combs et al.

(10) Patent No.: US 9,399,151 B1
(45) Date of Patent: Jul. 26, 2016

(54) FIRE FIGHTING SYSTEMS AND METHODS

(75) Inventors: Eric N. Combs, Goshen, IN (US);
Donald E. Sjolin, Granger, IN (US);
Fred Einstein, Fort Wayne, IN (US);
Kevin McGuire, New Paris, IN (US);
Lee R. Jones, Wakarusa, IN (US); John E. McLoughlin, Hauppauge, NY (US);
Neocles G. Athanasiades, Setauket, NY (US); Kiam Meng Toh, Saint James, NY (US); Kyle A. Stoops, Elkhart, IN (US)

(73) Assignees: Elkhart Brass Manufacturing Company, Inc., Elkhart, IN (US); Fire Research Corp., Nesconset, NY (US)

(*) Notice: Subject to any disclaimer, the term of this patent is extended or adjusted under 35 U.S.C. 154(b) by 984 days.

(21) Appl. No.: 13/587,614

(22) Filed: Aug. 16, 2012

Related U.S. Application Data

(60) Provisional application No. 61/524,313, filed on Aug. 16, 2011, provisional application No. 61/624,996, filed on Apr. 16, 2012, provisional application No. 61/625,522, filed on Apr. 17, 2012.

(51) Int. Cl.
*A62C 27/00* (2006.01)
*A62C 37/00* (2006.01)

(52) U.S. Cl.
CPC ....................... *A62C 37/00* (2013.01)

(58) Field of Classification Search
CPC ................................ A62C 37/00; A62C 37/50
USPC ............................................................. 169/24
See application file for complete search history.

(56) References Cited

U.S. PATENT DOCUMENTS

| | | |
|---|---|---|
| 3,786,869 A | 1/1974 | McLoughlin |
| 3,943,312 A | 3/1976 | Bernstein et al. |
| 3,974,879 A | 8/1976 | Nelson, Jr. et al. |

(Continued)

FOREIGN PATENT DOCUMENTS

| | | |
|---|---|---|
| WO | WO03/055714 A1 | 7/2003 |
| WO | WO03/059455 A2 | 7/2003 |

(Continued)

OTHER PUBLICATIONS

Webpage: STNews.com, New Monitor Position Indicator Safely Aims Water Stream at Fire, accessed Mar. 16, 2012.

(Continued)

*Primary Examiner* — Craig Kim
*Assistant Examiner* — Jason Fountain
(74) *Attorney, Agent, or Firm* — Faegre Baker Daniels LLP

(57) ABSTRACT

A control system for a fire fighting device is provided. The control system may include a controller configured to operably connect over a network to a first valve controller controlling a status of a first valve in response to an input from the controller, a second valve controlling a status of a second valve in response to an input from the controller, and a governor operably controlling a power source in response to an input from the controller. The control system may further comprise a touchscreen display operably connected to the controller, the display configured to display the status of the first and second valves and configured to receive an input from a user, wherein controller generates a manipulatable icon displayed on the touchscreen display, a manipulation of the icon generating the input from the controller to the first valve controller.

22 Claims, 24 Drawing Sheets

(56) References Cited

U.S. PATENT DOCUMENTS

| | | | |
|---|---|---|---|
| 3,981,618 A | 9/1976 | Nelson, Jr. | |
| 4,189,005 A | 2/1980 | McLoughlin | |
| 4,593,855 A | 6/1986 | Forsyth | |
| 4,611,290 A * | 9/1986 | Henningsen | G05D 16/2066 169/13 |
| 4,949,794 A | 8/1990 | Petit et al. | |
| 5,044,445 A | 9/1991 | Kayahara | |
| 5,223,822 A | 6/1993 | Stommes et al. | |
| 5,411,100 A | 5/1995 | Laskaris et al. | |
| 5,579,800 A | 12/1996 | Walker | |
| 5,727,933 A | 3/1998 | Laskaris et al. | |
| 5,888,051 A * | 3/1999 | McLoughlin | F04B 49/065 417/26 |
| 5,979,564 A | 11/1999 | Crabtree | |
| 6,343,615 B1 | 2/2002 | Miller et al. | |
| 6,421,593 B1 | 7/2002 | Kempen et al. | |
| 6,547,528 B1 | 4/2003 | Yoshida | |
| 6,553,290 B1 | 4/2003 | Pillar | |
| 6,651,900 B1 | 11/2003 | Yoshida | |
| 6,725,940 B1 | 4/2004 | Klein | |
| 6,757,597 B2 | 6/2004 | Yakes et al. | |
| 6,766,863 B2 | 7/2004 | Arvidson et al. | |
| 6,882,917 B2 | 4/2005 | Pillar et al. | |
| 6,885,920 B2 | 4/2005 | Yakes et al. | |
| 6,886,639 B2 | 5/2005 | Arvidson et al. | |
| 6,909,944 B2 | 6/2005 | Pillar et al. | |
| 6,922,615 B2 | 7/2005 | Pillar et al. | |
| 6,991,041 B2 | 1/2006 | Laskaris et al. | |
| 6,993,421 B2 | 1/2006 | Pillar et al. | |
| 7,006,902 B2 | 2/2006 | Archer et al. | |
| 7,024,296 B2 | 4/2006 | Squires | |
| 7,072,745 B2 | 7/2006 | Pillar et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,234,534 B2 | 6/2007 | Froland et al. | |
| 7,254,468 B2 | 8/2007 | Pillar et al. | |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,318,483 B2 | 1/2008 | Arvidson et al. | |
| 7,379,797 B2 | 5/2008 | Nasr et al. | |
| 7,389,826 B2 | 6/2008 | Linsmeier et al. | |
| 7,392,122 B2 | 6/2008 | Pillar et al. | |
| 7,412,307 B2 | 8/2008 | Pillar et al. | |
| 7,451,028 B2 | 11/2008 | Pillar et al. | |
| 7,522,979 B2 | 4/2009 | Pillar | |
| 7,555,369 B2 | 6/2009 | Pillar | |
| 7,571,662 B2 | 8/2009 | Pickering et al. | |
| 7,614,455 B2 | 11/2009 | Arvidson et al. | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,729,831 B2 | 6/2010 | Pillar | |
| 7,739,921 B1 | 6/2010 | Babcock | |
| 7,756,621 B2 | 7/2010 | Pillar et al. | |
| 7,784,554 B2 | 8/2010 | Grady et al. | |
| 7,792,618 B2 | 9/2010 | Quigley et al. | |
| 7,831,363 B2 | 11/2010 | Quigley | |
| 7,835,838 B2 | 11/2010 | Pillar et al. | |
| 7,848,857 B2 | 12/2010 | Nasr et al. | |
| 7,874,373 B2 * | 1/2011 | Morrow | A62C 27/00 169/24 |
| 7,878,703 B2 | 2/2011 | Roberts | |
| 7,889,187 B2 | 2/2011 | Freier et al. | |
| 7,954,508 B2 | 6/2011 | Doyle et al. | |
| 7,987,916 B2 | 8/2011 | Laskaris et al. | |
| 7,997,348 B2 | 8/2011 | Hosfield et al. | |
| 8,000,850 B2 | 8/2011 | Nasr et al. | |
| 8,095,247 B2 | 1/2012 | Pillar et al. | |
| 8,162,619 B2 | 4/2012 | Laskaris | |
| 2003/0158635 A1 | 8/2003 | Pillar et al. | |
| 2003/0195680 A1 | 10/2003 | Pillar | |
| 2004/0065450 A1 | 4/2004 | Yoshida | |
| 2004/0133319 A1 | 7/2004 | Pillar et al. | |
| 2005/0077057 A1 | 4/2005 | Laskaris | |
| 2005/0113996 A1 | 5/2005 | Pillar et al. | |
| 2005/0222287 A1 | 10/2005 | Roberts | |
| 2006/0131038 A1 | 6/2006 | Lichtig | |
| 2006/0180321 A1 | 8/2006 | Yoshida | |
| 2006/0243324 A1 | 11/2006 | Klein et al. | |
| 2007/0061054 A1 | 3/2007 | Rowe et al. | |
| 2007/0164127 A1 | 7/2007 | Lozier et al. | |
| 2007/0261509 A1 | 11/2007 | Meyer et al. | |
| 2008/0035201 A1 | 2/2008 | Roberts | |
| 2008/0041599 A1 | 2/2008 | Mulkey et al. | |
| 2008/0059030 A1 | 3/2008 | Quigley et al. | |
| 2008/0103651 A1 | 5/2008 | Pillar et al. | |
| 2008/0215190 A1 | 9/2008 | Pillar et al. | |
| 2008/0215700 A1 | 9/2008 | Pillar et al. | |
| 2008/0221741 A1 | 9/2008 | Pillar et al. | |
| 2008/0292472 A1 | 11/2008 | Laskaris | |
| 2009/0218110 A1 | 9/2009 | Laskaris et al. | |
| 2009/0260836 A1 | 10/2009 | Laskaris et al. | |
| 2010/0012332 A1 | 1/2010 | Fisher et al. | |
| 2010/0012333 A1 | 1/2010 | Fisher et al. | |
| 2010/0065286 A1 | 3/2010 | Hosfield | |
| 2010/0274397 A1 | 10/2010 | Lozier et al. | |
| 2010/0301668 A1 | 12/2010 | Yakes et al. | |
| 2010/0319479 A1 | 12/2010 | Sjolin et al. | |
| 2011/0064591 A1 | 3/2011 | McLoughlin et al. | |
| 2011/0127051 A1 | 6/2011 | Guse | |
| 2011/0200461 A1 | 8/2011 | Christensen et al. | |
| 2011/0240317 A1 | 10/2011 | Laskaris et al. | |
| 2012/0012344 A1 | 1/2012 | Mcloughlin et al. | |
| 2012/0061108 A1 | 3/2012 | Cerrano | |

FOREIGN PATENT DOCUMENTS

| | | |
|---|---|---|
| WO | WO03/060831 A2 | 7/2003 |
| WO | WO03/061235 A2 | 7/2003 |
| WO | WO2004/052756 A1 | 6/2004 |
| WO | WO2004/102105 A1 | 11/2004 |
| WO | WO2005/011943 A2 | 2/2005 |
| WO | WO205/021099 A2 | 3/2005 |
| WO | WO2005/039936 A2 | 5/2005 |
| WO | WO2005/100463 A2 | 10/2005 |
| WO | WO2006/037100 A1 | 4/2006 |
| WO | WO2006/052792 A2 | 5/2006 |
| WO | WO2006/118777 A2 | 11/2006 |
| WO | WO2007/140179 A2 | 12/2007 |
| WO | WO2008/002963 A2 | 1/2008 |
| WO | WO2008/021918 A2 | 2/2008 |
| WO | WO2009/002799 A2 | 12/2008 |
| WO | WO2009/108395 A1 | 9/2009 |
| WO | WO2010/148162 A2 | 12/2010 |
| WO | WO2012/033920 A2 | 3/2012 |

OTHER PUBLICATIONS

News Release, United States: Fire Department Gets New Truck, KCHW Newswire, Aug. 21, 2010, Euclid Infotech Private Ltd.
Webpage: KZ Valve.com, Motorized Valves and Controls, accessed Mar. 26, 2012.
Akron Brass—Full Line Catalog, Weldon—Akron Brass, undated.
Hale Products, Class 1 Pump Modules, 2010 Hale Products.
Hale Safe Buy Brochure, Hale Products, undated.
Webpage: Fire Apparatus, Monitors Becoming More Efficient, Easier to Control, Fire Apparatus Magazine, accessed Apr. 9, 2012.
Webpage: HALE, www.haleproducts.com, accessed Mar. 26, 2012.

* cited by examiner

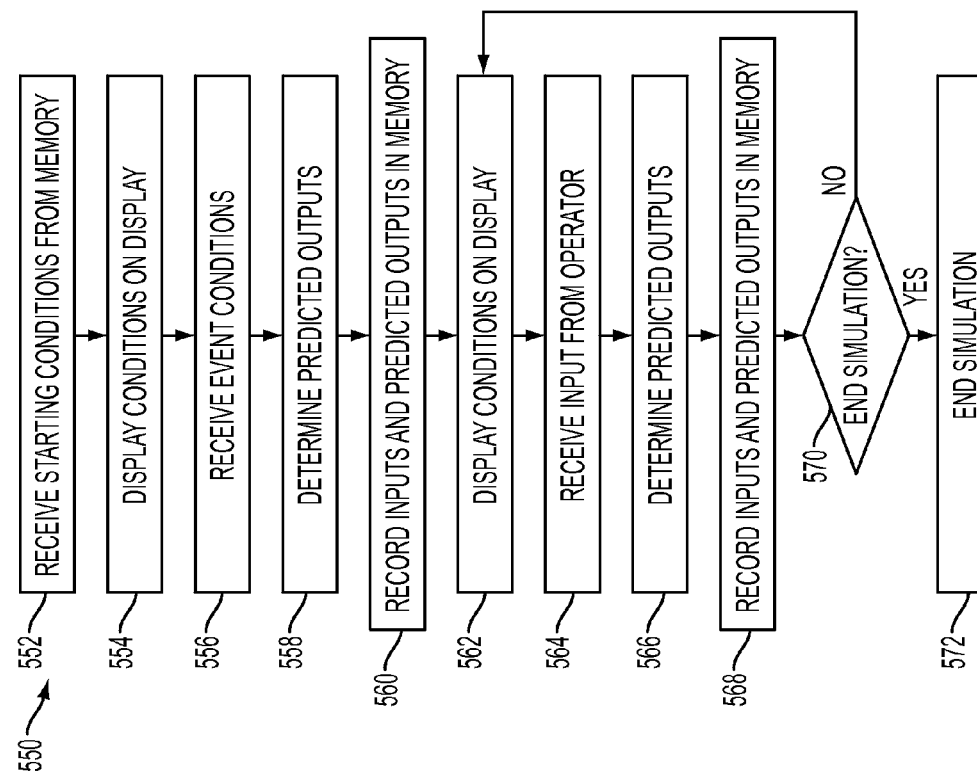

FIRE FIGHTING SYSTEMS AND METHODS

CROSS-REFERENCE TO RELATED APPLICATIONS

This application claims the benefit of U.S. Provisional Application Ser. No. 61/524,313 filed Aug. 16, 2011, U.S. Provisional Application Ser. No. 61/624,996 filed Apr. 16, 2012, and U.S. Provisional Application Ser. No. 61/625,522 filed Apr. 17, 2012, the disclosures of which are hereby incorporated by reference.

FIELD

The present invention generally relates to a fire fighting fluid delivery system and, more particularly, to a control system for controlling the flow of fire fighting fluid from a fluid delivery device of a fire fighting fluid delivery system, such as a nozzle, monitor, fire truck outlet or the like.

BACKGROUND AND SUMMARY

In one embodiment, a control system for a pump module for a fluid delivery device including a frame; a plurality of ground engaging members supporting the frame; a pump supported by the ground engaging members; a plurality of fluid valves supported by the ground engaging members and in fluid communication with the pump, is provided. In some embodiments, the system comprises a controller configured to operably connect over a network to a first valve controller controlling a status of a first valve in response to an input from the controller, and a touchscreen display operably connected to the controller, the display configured to display the status of the first valve and configured to receive an input from a user, wherein the controller generates a manipulatable icon displayed on the touchscreen display, a manipulation of the icon generating the input from the controller to the first valve controller.

In another embodiment, a method of determining whether to execute a command in a control system for a pump module for a fluid delivery system operating a plurality of modules, the fluid delivery system including a frame; a plurality of ground engaging members supporting the frame; a pump supported by the ground engaging members; a plurality of fluid valves supported by the ground engaging members and in fluid communication with the pump is provided. In some embodiments, the method comprises providing a boundary condition; providing a priority ranking for each module; receiving a command to execute; determining if executing the command will violate the boundary condition; executing the command when it was determined that executing the command will not violate the boundary condition; and upon determining that executing the command will violate the boundary condition, determining if the command is directed to a higher priority module than a priority of an operating module; determining not to execute the command when the command is directed to a lower priority module than the operating module; and reducing the output of the operating module prior to executing the command when the command is directed to a higher priority module than the operating module.

In still another embodiment, a method of maintaining a first flow rate through a first valve in a fluid delivery system, the fluid delivery system including a frame, a plurality of ground engaging members supporting the frame, a pump supported by the ground engaging members, a plurality of fluid valves supported by the ground engaging members and in fluid communication with the pump, and a controller controlling the pressure generated by the pump and the position of the plurality of valves is provided. In some embodiments, the method comprises providing the first flow rate of a fluid pressurized by the pump through the first valve; receiving at the controller a request for a second flow rate of the fluid through a second valve; determining with the controller a predicted effect on the first flow rate based on request; adjusting at least one of the position of the first valve and the pressure generated by the pump to maintain the first flow rate based on the predicted effect; and adjusting the position of the second valve to provide the second flow rate of the fluid through the second valve.

The disclosures of U.S. patent application Ser. No. 11/636,138 are expressly incorporated by reference herein.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIGS. 23A and 23B illustrate an exemplary processing sequences for a controller in a simulation mode according to the present disclosure.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

The embodiments disclosed herein are not intended to be exhaustive or to limit the invention to the precise forms disclosed in the following detailed description. Rather, the embodiments are chosen and described so that others skilled in the art may utilize their teachings.

While the present disclosure primarily involves mobile fire apparatus, it should be understood, that the invention may have application to other devices including stationary fire apparatus and other fluid delivery systems.

Figure 1:
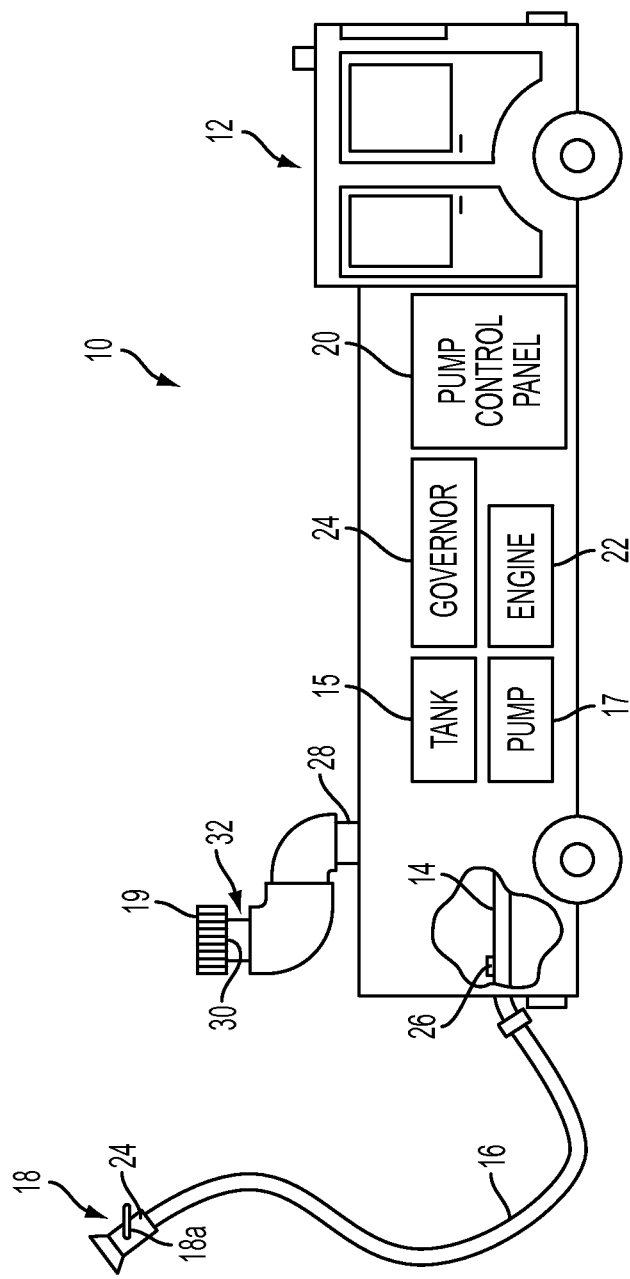
FIG. 1 illustrates an exemplary fire fighting fluid delivery system.

Referring to FIG. 1, an exemplary fire fighting fluid system 10 is shown. As will be more fully described below, system 10 provides enhanced control over the delivery of one or more fire fighting fluids and allows for one or more parameters of the fire fighting fluid to be monitored, such as pressure, flow rate, temperature, or other suitable fluid parameters, as well as parameters of the system components, such as a fire truck's engine speed (RPM), temperature, oil pressure, or other suitable system component parameters, to thereby provide enhanced management of the fire fighting fluid and its delivery through a fire fighting delivery device, such as a nozzle, a nozzle inlet, a monitor, a truck outlet connection, a pipe, or a valve, or other suitable fire fighting delivery devices. In one embodiment, one or more parameters of a fire fighting fluid are measured indirectly by monitoring a condition of a system component. Exemplary fire fighting fluids include water, foam, and other suitable types of fluid.

In the illustrated embodiment, system 10 is incorporated in a fire truck 12, which includes a fire truck outlet 14, which is in fluid communication with the truck fire fighting fluid storage tank 15 or an external water supply such as a fire hydrant (not shown) through the truck pump 17. A fire hose 16 is shown connected to outlet 14. In one embodiment, outlet 14 includes a valve coupled thereto, such as valve 102 (see FIG. 2). Fire hose 16 includes a nozzle 18 provided at the end of hose 16. An operator may adjust nozzle 18 to alter the delivery of a fire fighting fluid. In addition, truck 12 includes a monitor 19, which is in fluid communication with the truck tank 15, also through pump 17. Further, truck 12 includes a control panel 20, which may include various gauges and controls for controlling the operation of the truck pump 17, which pumps the fire fighting fluid, namely water, from the truck's storage tank or tanks 15 and for controlling the operation of other components of system 10. Truck 12 may be any type of fire truck, including an aerial truck with the monitor mounted to the ladder or other extendable structure.

Truck 12 further includes an engine 22. Engine 22 drives the operation of pump 17. The speed of engine 22 may be controlled through a governor 24. As demand for fire fighting fluid increases, the governor may be controlled to increase the speed of engine 22 and thereby increase the output of pump 17.

Figure 2:
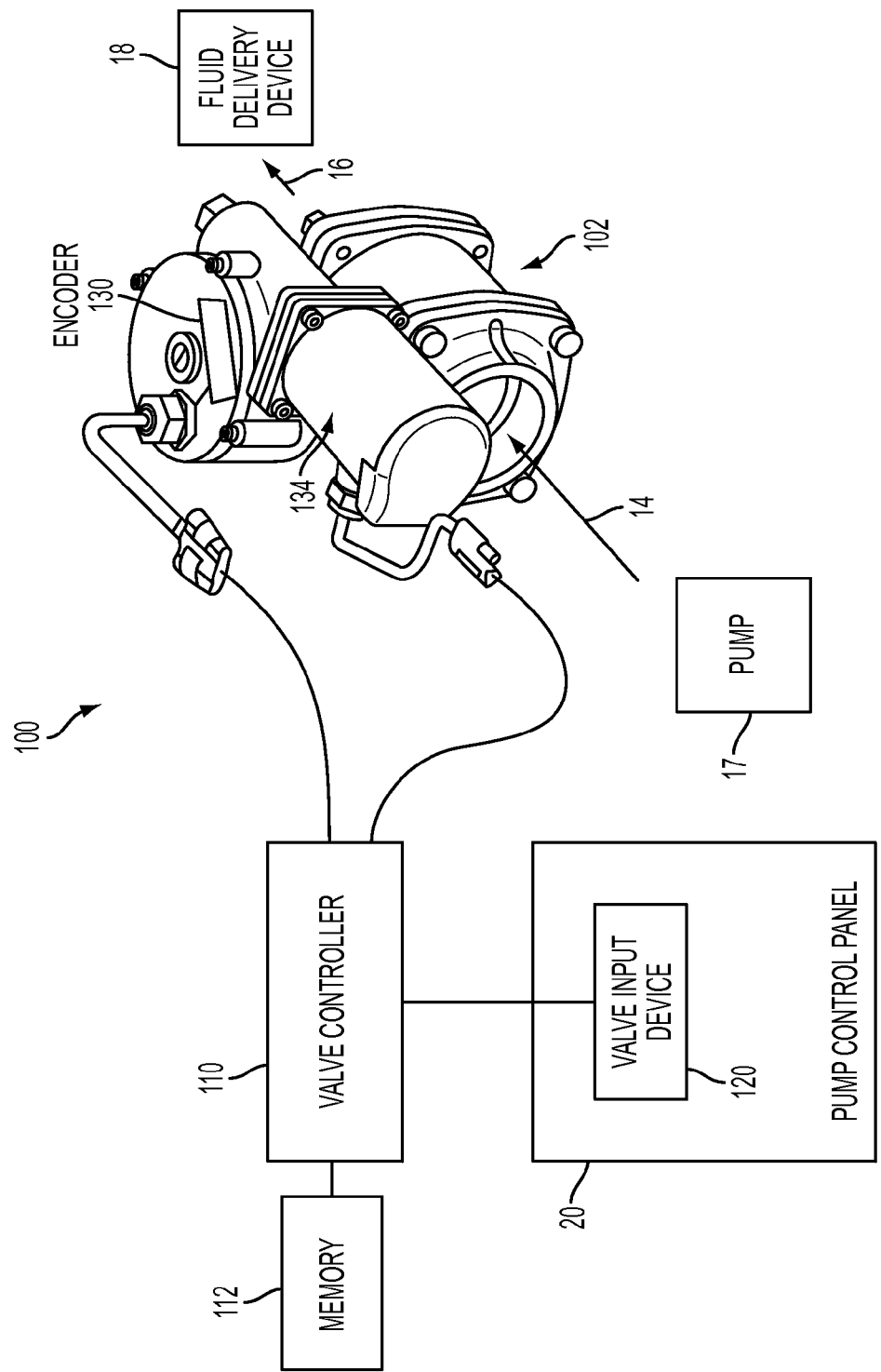
FIG. 2 illustrates an exemplary control system of the fire fighting fluid delivery system of FIG. 1.

Referring to FIG. 2, an exemplary control system 100 of the fire fighting fluid delivery system 10 of FIG. 1 is shown. Control system 100 includes a valve 102 which is coupled on one end to fire truck outlet 14 and on the other end to fire hose 16. Valve 102 may be closed to prevent the communication of fire fighting fluid from fire truck outlet 14 to fire hose 16 and opened to permit the flow of fire fighting fluid from fire truck outlet 14 to fire hose 16. Valve 102 is an electronically controlled valve which is moveable from a closed state to an open state by a motor 104 which moves a valve element, such as a ball, within valve 102. An exemplary electronically controlled valve is the 2900E Series valve available from Elkhart Brass located at 1302. West Beardsley Avenue in Elkhart, Ind. An encoder 106 monitors a position of the valve element of valve 102.

Control system 100 further includes a valve controller 110. Valve controller 110 controls the operation of valve 102. In one embodiment, controller 110 is a hardware controller. In one embodiment, controller 110 includes one or more processors which execute one or more processing sequences stored in memory 112.

In one embodiment, valve controller 110 is operatively coupled to motor 104 of valve 102 and encoder 106 of valve 102. Valve controller 110 is further operatively coupled to a valve input device 120. In one embodiment, valve input device 120 is provided as part of control panel 20 and is actuated by an operator to specify a desired configuration of valve 102. Valve input device 120 may be positioned in other locations than control panel 20.

Figure 3:
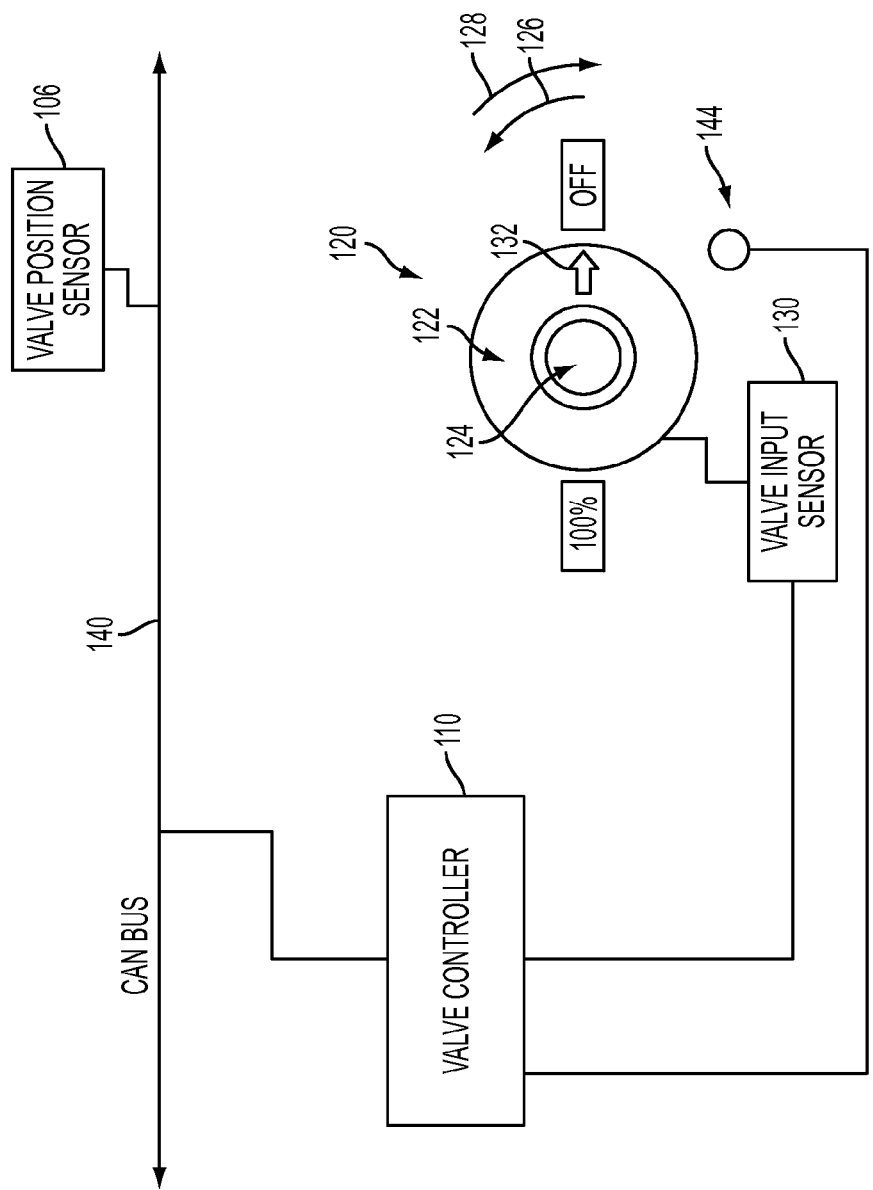
FIG. 3 illustrates an exemplary valve input device.

An exemplary valve input device 120 is a dial or knob 122 (see FIG. 3). Referring to FIG. 3, an operator may grasp a central portion 124 of knob 122 and rotate knob 122 in either direction 126 or direction 128. A valve input sensor 130 monitors a rotational position of knob 122 and provides an indication of that position to valve controller 110. An exemplary valve input sensors include inductive sensors, hall effect sensors, optical sensors, and other suitable sensors. A further exemplary knob is disclosed in U.S. patent application Ser. No. 12/793,109, filed Jun. 3, 2010, titled SURFACE MOUNT ROTARY CONTROL, the disclosure of which is expressly incorporated by reference herein.

Figure 4A:
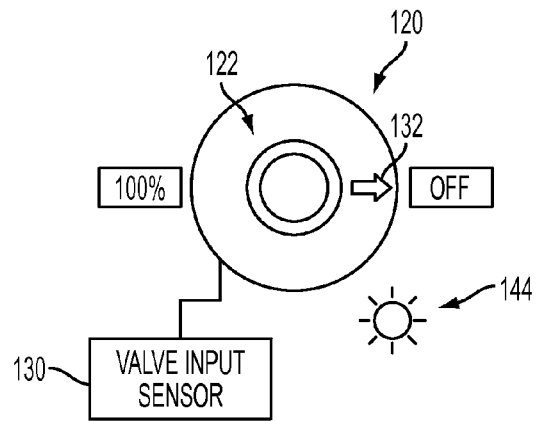
FIGS. 4A-4C illustrate exemplary positions of the valve input device of FIG. 3 and a visual indicator of the current valve configuration.
Figure 4B:
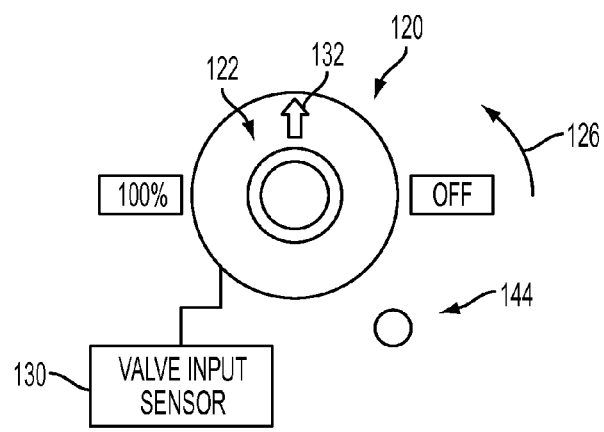

In the illustrated embodiment, knob 122 is rotatable from the position shown in FIG. 3 in direction 126 for about 180 degrees. Knob 122 includes indicia 132 which provides a visual cue of the current position of knob 122. This indicia 132 serves to visually communicate to an operator the desired configuration of valve 102. Referring to FIG. 4A, indicia 132 provides a visual cue that valve 102 is being closed or is closed. Referring to FIG. 4B, indicia 132 provides a visual cue that valve 102 is being opened about 50% or is opened to about 50%.

As shown in FIG. 3, in one embodiment, valve controller 110 communicates with the encoder 106 over a CAN bus 140. In one embodiment, valve controller 110 also communicates with valve input sensor 130 over CAN bus 140. Alternatively, valve controller 110 communicates with at least one of encoder 106 and valve input sensor 130 over a wireless network. Valve controller 110 is also operatively coupled to a visual indicator 144. Exemplary visual indicators include LEDs and other suitable light units. Once valve 102 is configured to correspond with the current position of knob 122, valve controller 110 may illuminate visual indicator 144 to provide a visual cue to the operator that valve 102 is in the desired configuration. In one embodiment, additional visual indicators are provided or a visual effect of visual indicator 144 (blinking or steady) provide the operator with a current configuration of valve, an alarm or maintenance condition of valve 102, or other information related to valve 102.

In one embodiment, control system 100 allows an operator to adjust knob 122 and then move on to an additional task. Valve controller 110 monitors the position of knob 122 through valve input sensor 130 and adjusts the configuration of valve 102 to correspond to the position of knob 122. Knob 122 has a first range of motion which is scaled to correspond to a range of motion of valve 102. In the illustrated embodiment, when knob 122 is turned all the way in direction 128, knob 122 is at a first end of its range of motion which corresponds to valve 102 being closed and when knob 122 is turned all the way in direction 126, knob 122 is at a second end of its range of motion which corresponds to valve 102 being fully opened. Positions of knob 122 in between correspond to a partially opened state of valve 102. The percentage that valve is opened is the percentage of the range of travel that knob 122 has rotated in direction 126.

Figure 4C:
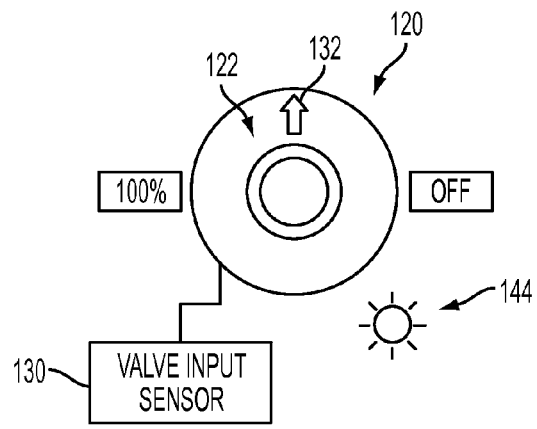

The operation of control system 100 is explained with reference to FIGS. 4A-4C. In FIG. 4A, knob 122 is oriented such that indicia 132 points to the off configuration of valve 102 and valve 102 is in the off position, as indicated by valve controller 110 having illuminated visual indicator 144. An operator rotates knob 122 in direction 126 to set a desired position of valve 102 at about 50%. Valve controller 110 receives an indication of this from valve input sensor 130 and in turn actuates valve 102 with motor 104. Encoder 106 provides an indication to valve controller 110 of the current configuration of valve 102. Since valve 102 is not in the desired configuration, valve controller 110 does not illuminate visual indicator 144. Once valve 102 reaches the desired configuration, sometimes taking several seconds, as indicated by encoder 106, valve controller 110 illuminates visual indicator 144 (see FIG. 4C).

Figure 5:
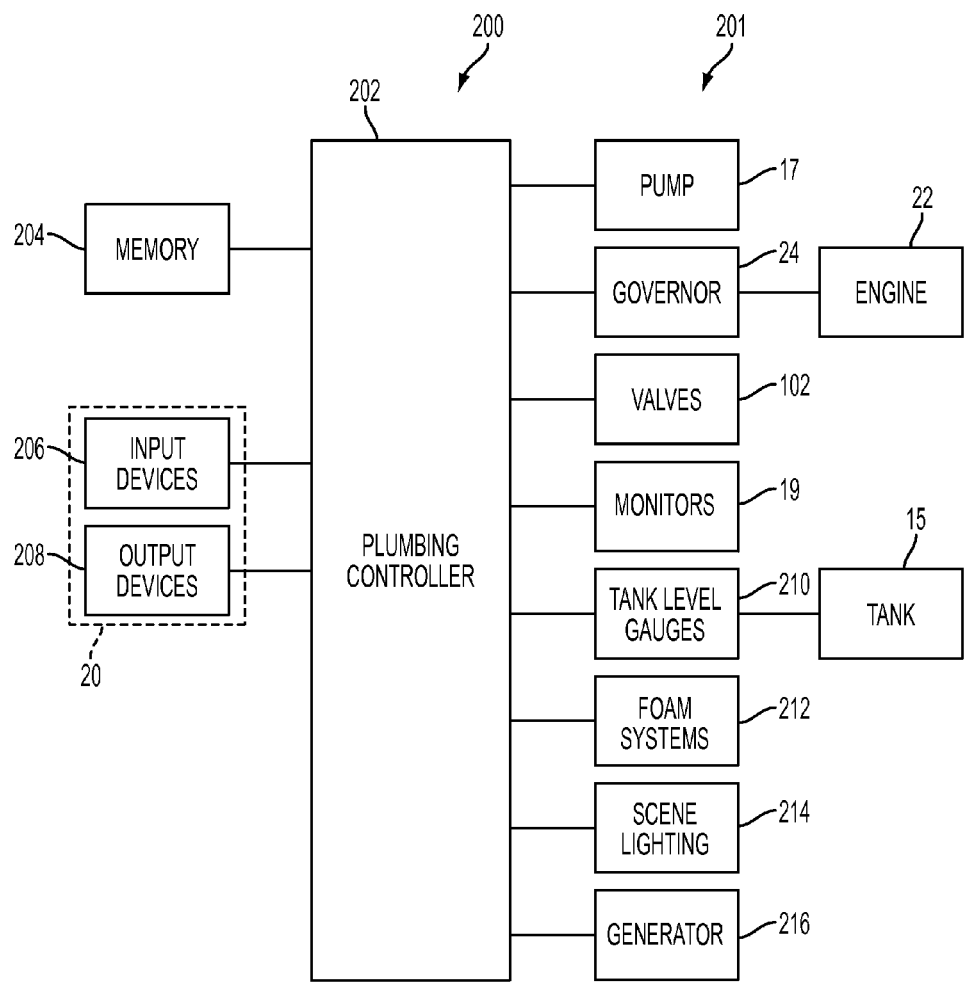
FIG. 5 illustrates another exemplary control system of the fire fighting fluid delivery system of FIG. 1.

Referring to FIG. 5, another exemplary control system 200 for the fire fighting fluid system 10 is shown. Control system 200 includes a plumbing controller 202 which receives input from multiple components of fire fighting fluid system 10 and controls the operation of multiple components of fire fighting fluid system 10. In one embodiment, plumbing controller 202 communicates with the other components of fire fighting fluid system 10 over a CAN bus 140. In one embodiment, plumbing controller 202 communicates with at least one of the other components of fire fighting fluid system 10 over a wireless communication system, such as by RF transmission.

Plumbing controller 202 has access to one or more memories 204. Memory 204 includes data received from one or more of the other components of fire fighting fluid system 10 and processing sequences for controlling the operation of the other components of fire fighting fluid system 10. In one embodiment, plumbing controller 202 replaces valve controller 110. In one embodiment, plumbing controller 202 communicates with valve controller 110 and provides instructions to valve controller 110.

Plumbing controller 202 is a central controller for fire fighting fluid system 10 and communicates with the controllers of or directly controls various components 201 of fire fighting fluid system 10. Exemplary components 201 of fire fighting fluid system 10 include truck pump 17, governor 24, valve 102, monitor 19, tank level gauges 210 associated with truck fire fighting fluid storage tank 15, foam systems 212, scene lighting systems 214, generator 216, and other exemplary components of fire fighting fluid system 10. Plumbing controller 202 receives input for the respective sensors of one or more of the components 201 and provides instructions to control the operation of one or more of components 201.

In one embodiment, plumbing controller 202 is a CAN enabled controller that receives feedback information and send commands to multiple components 201. This allows for automation of more controls so that the operator may give inputs for desired operations and multiple components 201 work in unison to achieve the desired operation. For example, a pump operator could indicate to the plumbing controller 202 through input devices 206 that they want three hose lines to be activated with each to a desired flow rate. In one embodiment, a respective valve input device 120 for each of the three lines is actuated by the operator. The engine RPM, tank valve associated with tank 15, and discharge valves 102 for these lines would then be actuated by plumbing controller 202 to achieve this desired operation of three hose lines to be activated with each to a desired flow rate. If a fourth hose line is needed, the pump operator provides a request to plumbing controller 202 through input devices 206 this fourth line to be activated to the desired flow rate and needed components 201 would be actuated by plumbing controller 202 to achieve this desired operation. In one embodiment, plumbing controller 202 adjusts one or more of engine 22, governor 24, a valve 102 associated with one of the current lines or additional fourth line, and valve 250 (see FIG. 6) associated with one of the current lines or additional, to achieve the desired operation. In one embodiment, plumbing controller 202 adjusts needed components 201 based on the discharge pressure of each line. Discharge pressure may be exemplarily measured using pressure sensors 254 at the nozzle 18 of the current and additional lines or at a discharge 32 of monitor 19. In another embodiment, plumbing controller 202 adjusts the needed component based on predicted conditions from activating the additional line. In other embodiments, more or fewer than three hose lines are activate, and more than one hose line is desired to be added.

Plumbing controller 202 also allows for central diagnostics of all the components from a central location allowing for improved notification to the operator when an error has occurred and improved troubleshooting of what has failed. Exemplary output devices include gauges, displays, lights, and other devices for communicating information to the operator. In one embodiment, the output device 208 is a display screen and the diagnostics information is provided on the display screen. In one embodiment, one or more touch screens are provided which function as both an input device 206 and an output device 208. In one embodiment, plumbing controller 202 may also utilize other exemplary input and display technology. For example a single knob may be used to control various devices by simply selecting on the touch screen which device is desired to be controlled. Also, a single display may be used to convey information about multiple devices.

Figure 6:
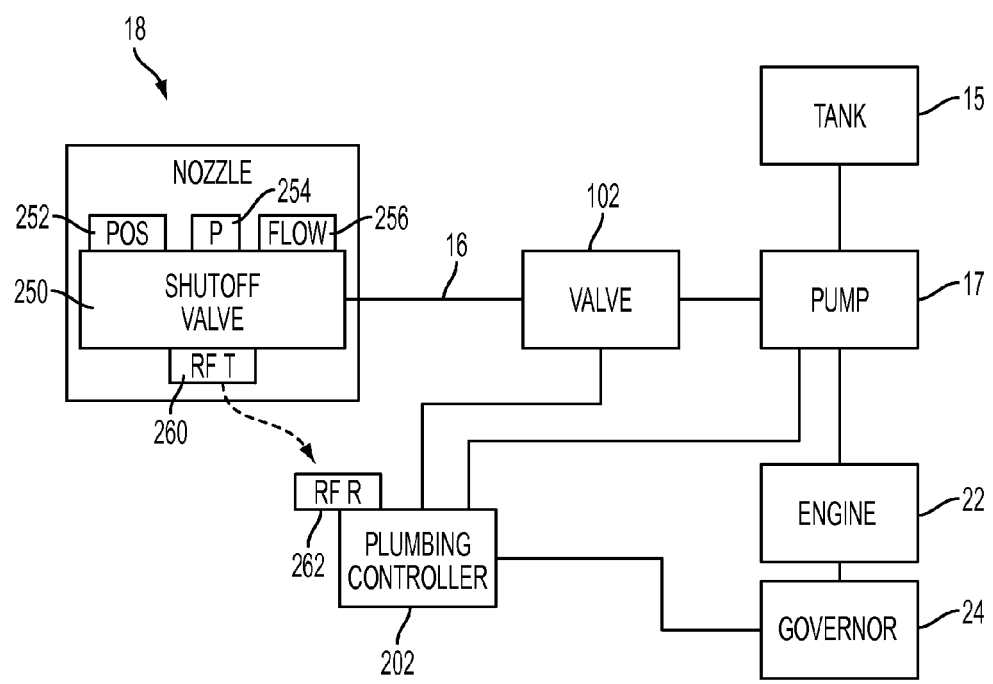
FIG. 6 illustrates still another exemplary control system of the fire fighting fluid delivery system of FIG. 1.

Referring to FIG. 6, in one embodiment, plumbing controller 202 monitors a shutoff valve 250 of a nozzle 18 coupled to an end of a fire hose 16. In one embodiment, a position sensor 252 is provided that monitors a position of a shutoff lever of shutoff valve 250 thereby providing an indication of whether the shutoff valve is closed or opened and to what degree it is opened. A pressure sensor 254 may be provided as well to monitor a pressure of the fluid in nozzle 18. In one example, a pressure of the fluid prior to shutoff valve 250 is monitored. In another example, a pressure of the fluid after shutoff valve 250 is monitored. In another example, multiple pressure sensors are provided. A flow sensor 256 may be provided as well to monitor a flow rate of the fluid in nozzle 18. In one example, a flow rate of the fluid prior to shutoff valve 250 is monitored. In another example, a flow rate of the fluid after shutoff valve 250 is monitored. In another example, multiple flow rate sensors are provided.

Nozzle 18 further includes a wireless transmitter 260 for sending sensor data to plumbing controller 202. In the illustrated embodiment, the wireless transmitter 260 is an RF transmitter.

Figure 7:
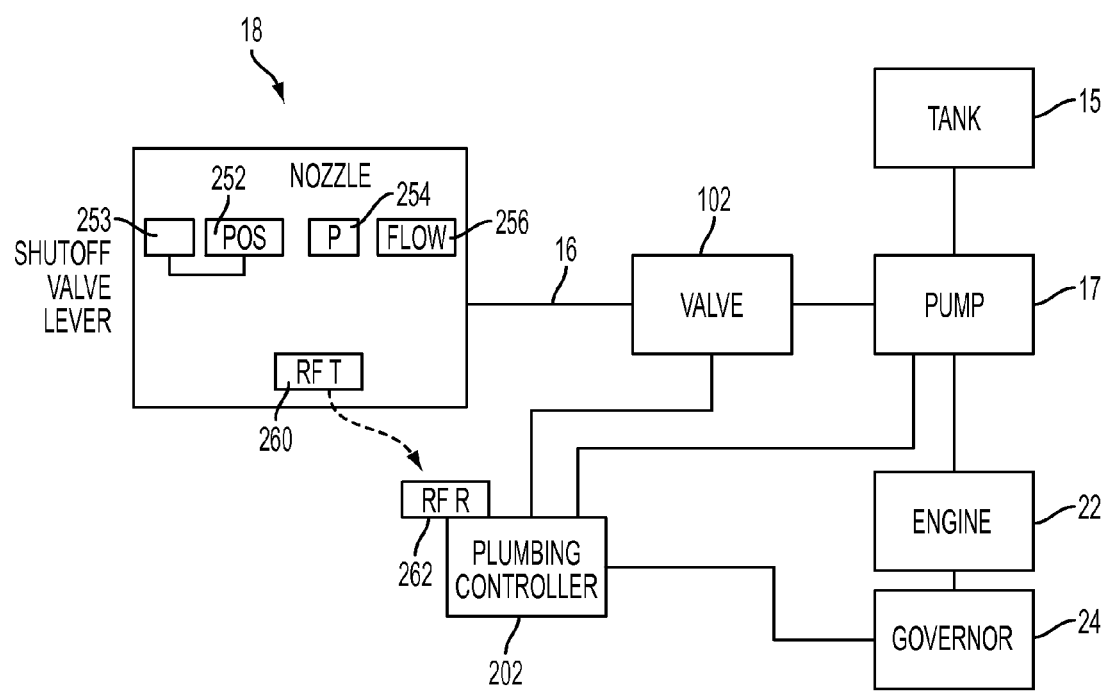
FIG. 7 illustrates yet another exemplary control system of the fire fighting fluid delivery system of FIG. 1.

As an operator of nozzle 18 manipulates shutoff valve 250, the data collected by the sensors of shutoff valve 250 are transmitted by transmitter 260 to controller 202. Controller 202 automatically adjusts the pressure of fire fighting fluid in hose 16 by either increasing the output of pump 17 or decreasing the output of pump 17. In one embodiment, a nozzle 18 may be set to a desired flow rate, the controller 202 may maintain the desired flow rate as variables change such as additional discharges (valves 102) being opened or closed. In addition, the nozzle operator could be given more control where opening or closing the nozzle shut-off valve is directly linked to changing flow rate where the controller can modulate engine RPM and valve positions. This control system would also offer the ability for the nozzle to display flow rate to the nozzle operator, or broadcast the information which could be displayed by another device such as a SCBA mask with internal display. This control could potentially eliminate the need for a shut-off valve in the nozzle. An example is shown in FIG. 7. Referring to FIG. 7, nozzle 18 no longer has a shutoff valve, but still has a shutoff valve lever 253 whose position is monitored by position sensor 252. The shut-off handle or lever simply becomes a input that controls the valve located in/on the fire truck.

Figure 8:
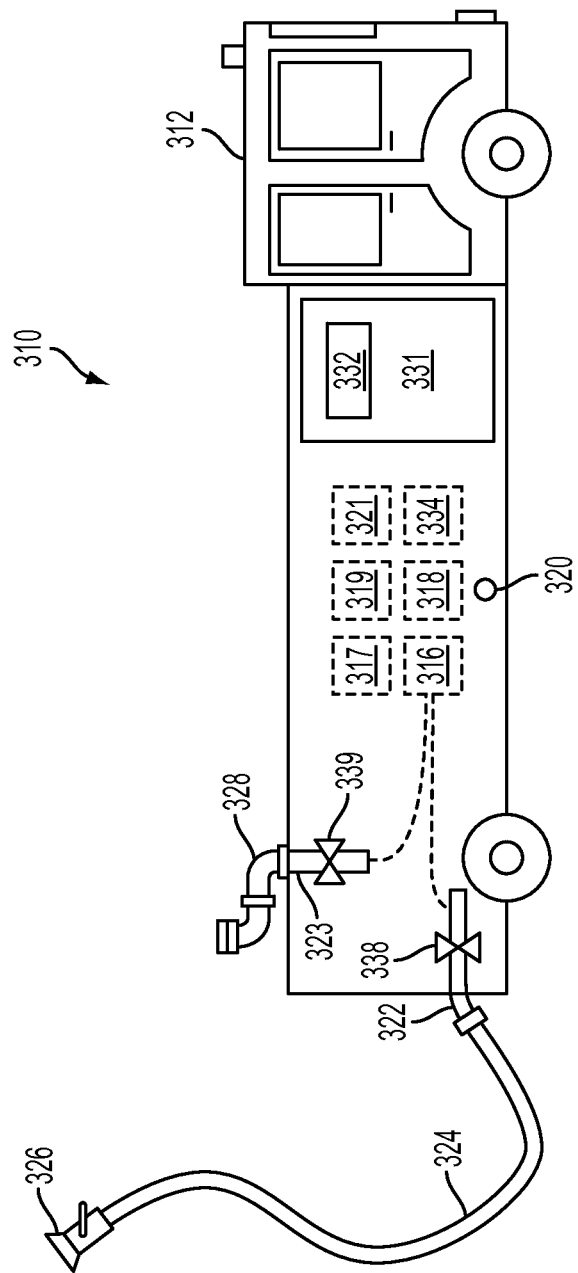
FIG. 8 illustrates another exemplary fire fighting fluid delivery system.

Referring to FIG. 8, an exemplary firefighting fluid delivery system 310 is illustrated. In the illustrated embodiment, system 310 is incorporated as part of fire truck 312. Fire truck 312 includes a power source operably connected to at least one wheel of the fire truck to propel the fire truck. An exemplary power source is engine 334. Fire truck 312 further includes a cab area containing user controls. Exemplary user controls include steering, acceleration, braking, communication, navigation, warning and alert systems including lights and sirens, and other suitable controls.

Fire truck 312 includes a fluid supply and pump 316. Fluid supply may include one or more storage tanks 318 for water, foam, or other suitable fire suppressing fluid. Fluid supply may also include a fluid inlet 320 for supplying additional fluid to the system from an external source (not shown). Exemplary external sources include fire hydrants, other firefighting vehicles including tanker trucks, rivers, lakes, and other suitable sources.

In one embodiment, fire truck 312 includes additional systems. Exemplary additional systems include foam systems 317, scene lighting 319, and generator 321.

Fire truck 312 further includes one or more fluid outlets. As illustrated, first fluid outlet 322 is attached to a hose 324 having a nozzle 326 at the distal end. Fire truck 312 also includes monitor 328 attached to second fluid outlet 323. Fire truck may include additional fluid outlets. Each fluid outlet is in fluid communication with the fluid supply through pump 316.

Figure 10:
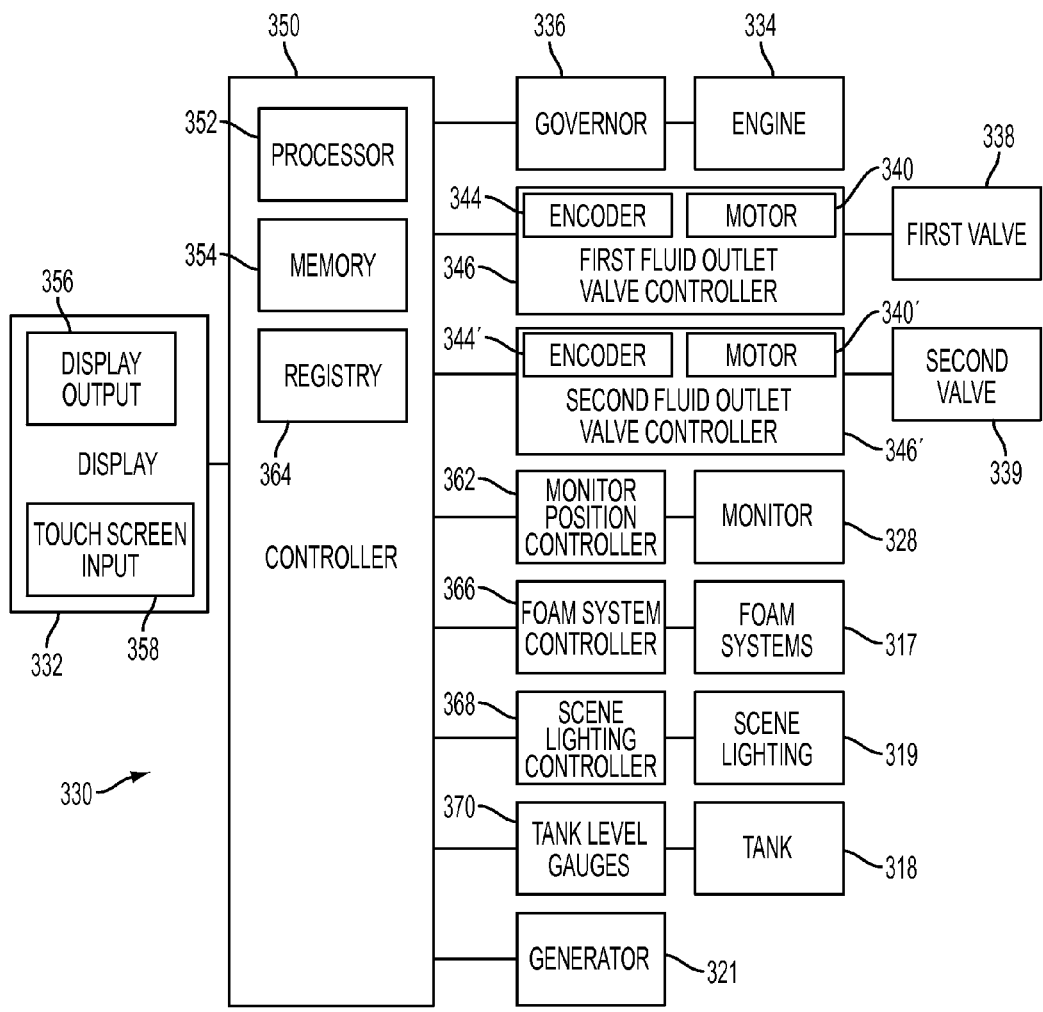
FIG. 10 illustrates an exemplary a control system according to the present disclosure.

Fire truck 312 includes a control system 330 (see FIG. 10). Control system 330 is located at least partially in a housing 331. As will be more fully described below, control system 330 provides enhanced control over of the delivery of one or more fire fighting fluids and allows for one or more parameters of the fire fighting fluid to be monitored to thereby provide enhanced management of the fire fighting fluid and its delivery through a fire fighting delivery device. Exemplary fluid parameters include pressure, flow rate, temperature, and other suitable parameters. Exemplary system component parameters include fire truck's engine speed (RPM), temperature, oil pressure, and other suitable parameters. Exemplary firefighting delivery devices include nozzles, nozzle inlets, monitors, outlet connections, pipes, valves, and other suitable devices.

Control system 330 includes a user interface display 332. As illustrated, display 332 may be mounted on the side of fire truck 312. In other embodiments, display 332 may be mounted behind a cab or fire truck 312 or internal to the cab of the fire truck 312. Display 332 may include inputs and outputs for various gauges and controls for controlling the operation of pump 316, which pumps the fire fighting fluid from tank 318 and for controlling the operation of other components of system 310. In one embodiment of control system 300, display 332 includes additional input and output devices in addition to those listed. Exemplary input devices includes knobs, switches, lever, buttons, keyboards, and other suitable devices providing an input. Exemplary output devices include displays, sirens, lights, gauges, and other suitable devices providing an indication to an operator. Fire truck 312 may be any type of fire truck, including an aerial truck with the monitor mounted to the ladder or other extendable structure.

Figure 9A:
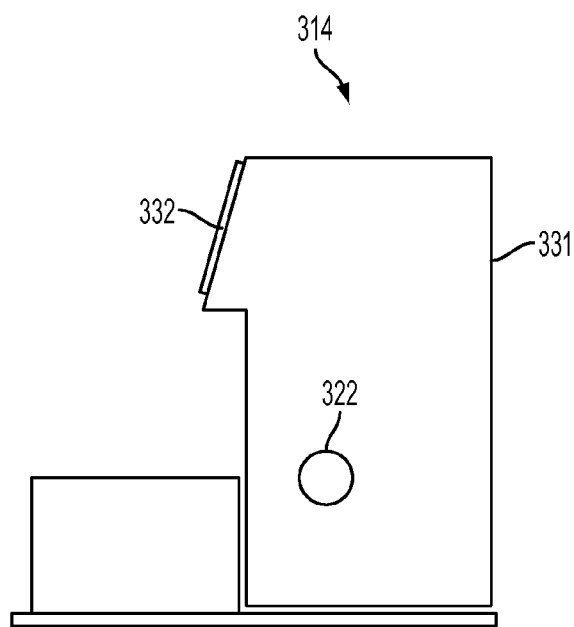
FIG. 9A illustrates a side view of an exemplary pump module to be attached to a vehicle.
Figure 9B:
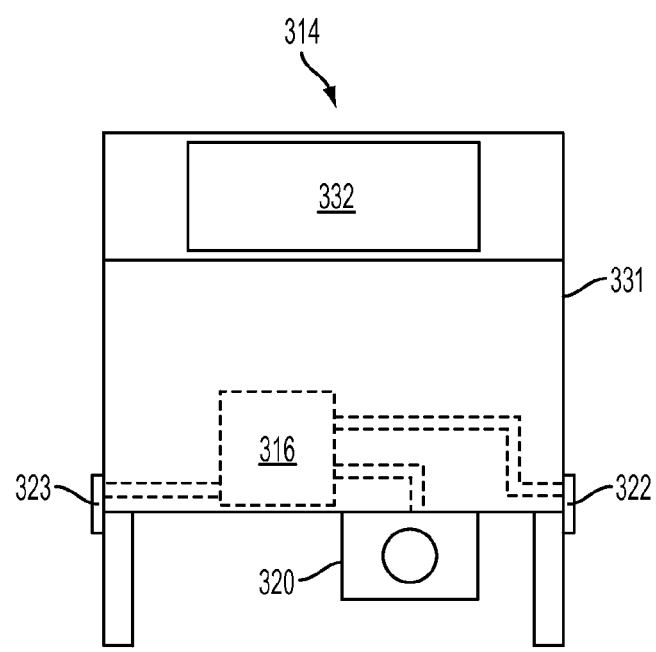
FIG. 9B illustrates a front view of the pump module of FIG. 9A.

FIGS. 9A and 9B illustrate another exemplary firefighting fluid delivery system 314. System 314 is configured to be attached to a fire truck or other vehicle. Although illustrated as a top-mount pump module, system 314 may be side-mount pump module or configured to be located elsewhere on fire truck 312. Control system 330 is at least partially located in housing 331. System 314 includes pump 316, which pressurizes water received from fluid inlet 320. Fluid inlet 320 receives water from a water tank, such as tank 318, or an external water source. System 314 further includes at least first fluid outlet 322, and as illustrated includes second fluid outlet 323. Fluid outlets 322, 323 may be attached to piping or manifolds in the attached vehicle. Fluid delivery devices, such as hoses 324 or monitors 328 may be fluidly connected to fluid outlets 322, 323 through the vehicle piping. Valves 338 and 339 may be positioned internal to housing 331, or may be remotely located in other portion of fire truck, attached to nozzles 326, or the like.

FIG. 10 illustrates an exemplary schematic of the control system 330 of the present disclosure. In the illustrated embodiment, control system includes controller 350. Controller 350 may be a single controller or multiple controllers. Controller 350 may implement programming implemented as electrical circuits, software being executed by a processor 352, a processing unit, a combination thereof, or any other suitable configuration of software and/or software enabled hardware. In one embodiment controller 350 comprises a computer chip with embedded software code. Controller 350 may include memory 354. Memory is a non-transitory computer readable medium and may be a single storage device or may include multiple storage devices, located either locally with controller 350 or accessible across a network. Computer-readable media may be any available media that may be accessed by controller 350 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by controller 350. In one embodiment, controller 350 communicates data, status information, or a combination thereof to a remote device for analysis. In another embodiment, memory may further include operating system software, such as the LINUX operating system or the WINDOWS operating system available from Microsoft Corporation of Redmond Wash. Memory further includes communications software if computer system has access to a network through a network connection, such as a local area network, a public switched network, a CAN network, and any type of wired or wireless network. Any exemplary public switched network is the Internet. Exemplary communications software includes e-mail software, internet browser software. Other suitable software which permit controller 350 to communicate with other devices across a network may be used. In one embodiment, controller 350 executes one or more processing sequences stored on an external memory 355 (See FIG. 21) accessible by controller 350.

Controller 350 is operably connected with display 332. An exemplary display 332 is a touch screen monitor having display output 356 for displaying output to a user and a touch screen input 358 for receiving commands from a user. An exemplary touch screen monitor is the HIS-UM22 22 inch panel mount monitor and industrial touch screen available from Hope Industrial Systems, Inc., Atlanta Ga. Other suitable display sizes and screens may also be used.

In the exemplary embodiment illustrated in FIG. 10, controller 350 is operably connected with external systems, such as engine 334, valve controllers 346, 346', monitor controller 362, and other systems over a CAN bus network. The CAN bus allows for two-way communication between the controller 350 and the remote systems. In one embodiment, controller 350 sends commands to the remote systems and receives status and feedback data back from the remote systems over the CAN bus network.

Controller 350 may be housed at least partially in housing 331. In one embodiment, controller 350 is completely housed in housing 331. In another embodiment, controller 350 is housed in a second housing (not shown) physically separated from display 332 and located in a protected position in fire truck 312. Exemplary protected positions include in the cab of fire truck 312, in a deep interior position of fire truck 312, or other suitable positions. Positioning controller 350 in a protected position protects controller 350 from damage and allows controller 350 to continue operating even if display 332 is damaged and no longer able to operate. In an exemplary embodiment, a backup display (not pictured) is positioned near controller 350 in the protected position or another location on fire truck 312 and provides functionality similar to display 332. In one embodiment, the backup display is activated and allows an operator to operate controller 350 only if display 332 is damaged or otherwise not operating. In another embodiment, both the backup display and display 332 can be used to operate controller 350 regardless of whether display 332 is damaged.

Engine 334 drives the operation of pump 316. The speed of engine 334 may be controlled through a governor 336. As demand for firefighting fluid increases, governor 336 may be controlled to increase the speed of engine 334 and thereby increase the output of pump 316.

Figure 13:
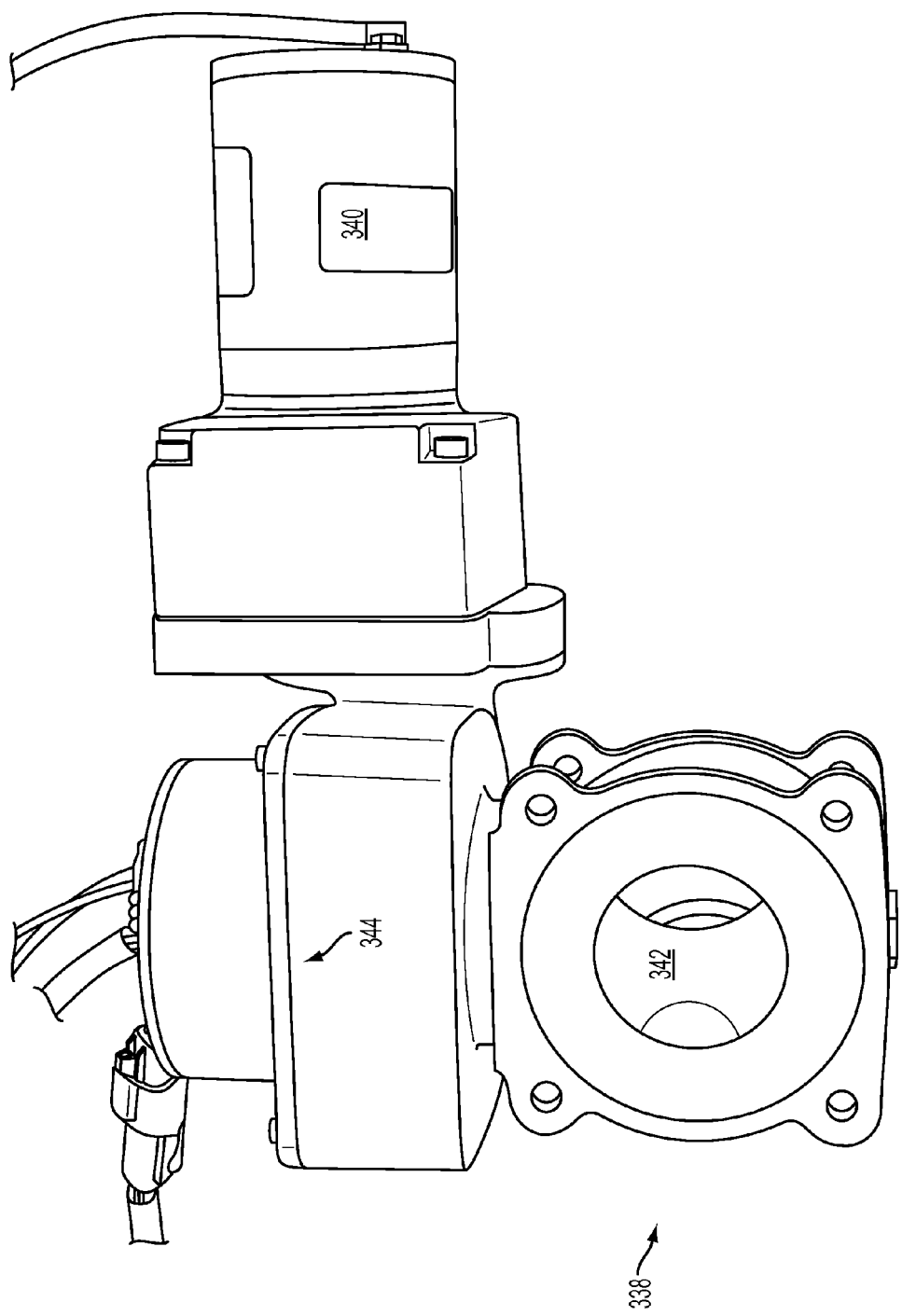
FIG. 13 illustrates an exemplary valve controlled by the portion of the user display of FIG. 12.
Figure 16:
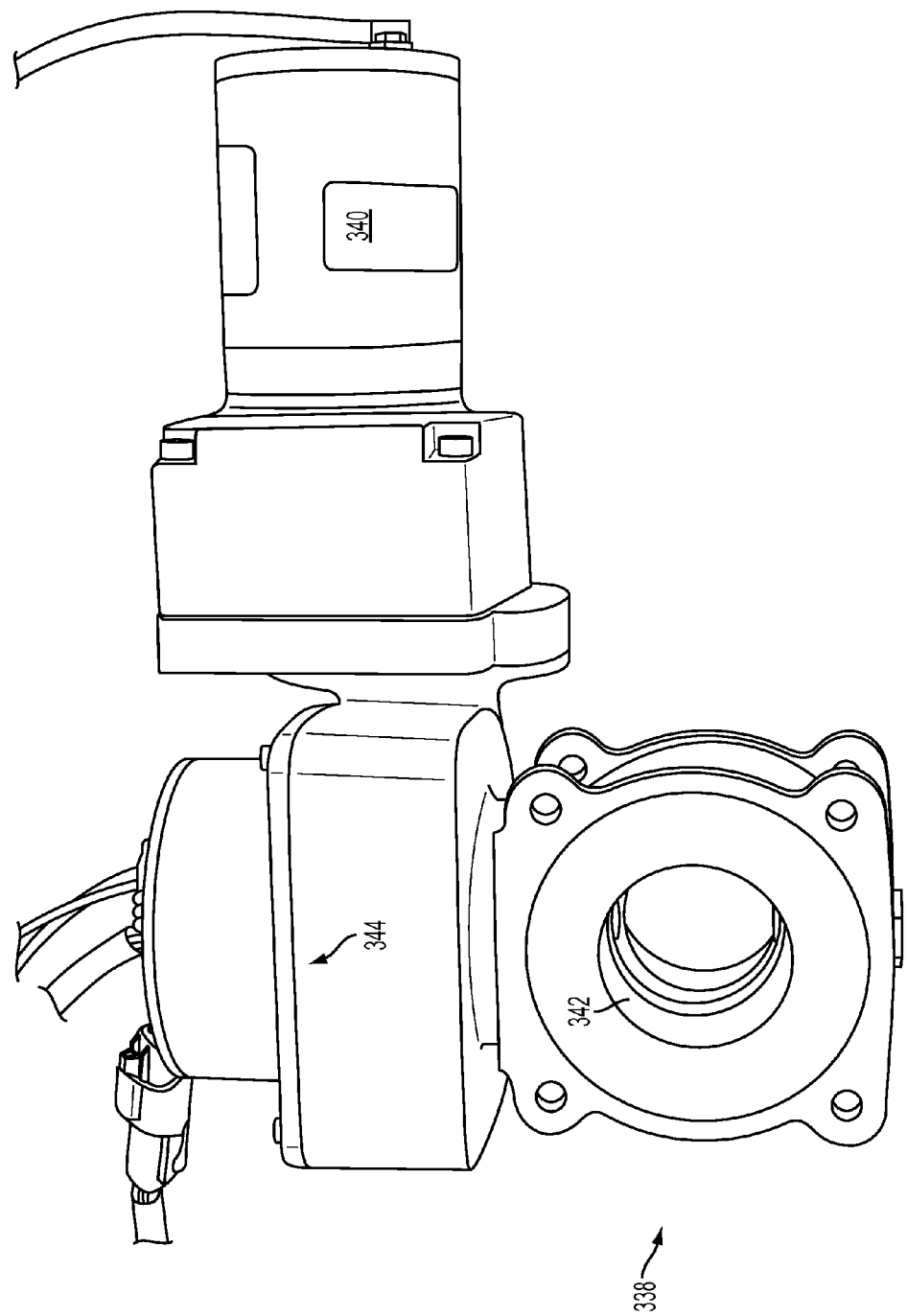
FIG. 16 illustrates an exemplary valve controlled by the portion of the user displays of FIG. 15.

First fluid outlet 322 includes first fluid outlet valve 338. An exemplary valve 338 is illustrated in FIGS. 13 and 16. Valve 338 controls the flow of fluid to the fluid outlet. Valve 338 may be closed to prevent the communication of fluid from the pump 316 to hose 324, monitor 328, or other fluid outlet. Valve 338 is an electronically controlled valve which is moveable from a closed state to an open state by a motor 340 through a movement of a valve element, such as a ball 342, within valve 338. An exemplary electronically controlled valve is the 2900E Series valve available from Elkhart Brass located at 1302. West Beardsley Avenue in Elkhart, Ind. An encoder 344 monitors a position of the valve element of valve 338.

First fluid outlet valve 338 is controlled by first fluid outlet valve controller 346, which is operably connected with controller 350 as part of control system 330. Additional fluid outlet valves, such as second outlet valve 339, are similarly controlled by fluid outlet valve controllers 346' operably connected with controller 350.

In one embodiment, valve controller 346 is a hardware controller. In one embodiment, valve controller 346 includes one or more processors which execute one or more processing sequences stored in memory. In one embodiment, valve controller 346 is operatively coupled to motor 340 and encoder 344 of valve 338. A desired configuration of valve 338 specified by a user through touch screen input 358 is communicated to valve controller 346, which positions ball 342 in the proper orientation by moving motor 340 while monitoring encoder 344.

In one exemplary embodiment, other systems may also be operably connected by the CAN bus network to controller 350. Monitor controller 362 may control orientation of monitor 328 with respect to the fire truck 312 and the angle of a portion of monitor 328 relative the rest of monitor 328. Exemplary methods of controlling a monitor may be found in U.S. Patent Publication 2009/0101368, herein incorporated by reference. Additional systems and controllers connected by the CAN bus network to controller 350 include foam system controller 366 and foam system 317, scene lighting controller 368 and scene lighting 319, tank level gauges 370 and tank 318, generator 321, and other suitable devices and controllers including aerial lifts and ladders.

Using a commercially available network, such as CAN bus, allows controller 350 to communicate with a wide variety of commercially available systems. These systems can be distributed around fire truck 312 or nearby. Additional systems can be connected to the CAN bus network, allowing controller 350 to monitor and control many systems. Controller 350 may display outputs from these systems on display 332 as outputs, and receive inputs from a user for each system.

In one embodiment, controller 350 is connected to a CAN enabled network that may receive feedback information and send commands to multiple components. This allows for automation of more controls so that the operator may give inputs for desired operations and multiple components may be configured to work in unison to achieve the desired operation. For example, a pump operator indicates to controller 350 through display 332 that they want three hose lines to be activated with each to a desired flow rate. In one embodiment, a respective valve display 402, 404, 406, for each of the three lines are actuated by the operator. The engine RPM, tank valve associated with tank 318, and discharge valves is then actuated by controller 350 to achieve this desired operation of three hose lines to be activated with each to a desired flow rate. If a fourth hose line is needed, the pump operator provides a request to controller 350 through display 332 for this fourth line to be activated to the desired flow rate, and the needed components would be actuated by controller 350 to achieve the desired settings. In one exemplary embodiment, governor 336 increases the RPM of engine 334 and controller 350 and/or a valve controller 346 opens a valve associated with the fourth line.

In another embodiment, controller 350 includes a registry 364 of the remote systems communicating with controller 350 over the CAN network. Exemplary remote systems are shown in FIG. 10 and include governor 336, engine 334, first fluid outlet valve controller 346, first valve 338, second fluid outlet valve controller 346, second valve 339, monitor position controller 362, monitor 328, foam system controller 366, foam system 317, scene lighting controller 368, scene lighting 319, tank level gauges 370, tank 318, and generator 321. Upon receiving a command, such as from a user through the touch screen input 358 of display 332, controller 350 determines an appropriate command to one or more of the remote systems. Using registry 364, controller 350 determines the appropriate identifier for the remote system and CAN message details and communicates the command to the system over the CAN network. The remote system acts in response to the command and transmits data back to controller 350. Controller 350 receives the transmitted data and may display selected outputs on display output 356 of display 332. In one exemplary embodiment, for systems having a sub-controller attached to controller 350 over the network, such as valve controllers 346, 346', monitor controller 362, foam system controller 366, and scene lighting controller 368, controller 350 may transmit a desired state of the sub-system, and the sub-controller may cause the sub-system to respond to meet the desired state.

Controller 350 also allows for central diagnostics of all the components from a central location allowing for improved notification to the operator when an error has occurred and improved troubleshooting of what has failed. In one embodiment, the diagnostics information is provided on display 332.

Referring to FIG. 8, in one embodiment, nozzle 326 may include a position sensor 252 that monitors a position of a shutoff lever of shutoff valve 250, a pressure sensor 254 to monitor a pressure of the fluid in nozzle 326 or a flow sensor 256 to monitor a flow rate of the fluid in nozzle 326, as in FIGS. 6-7. Sensors 252, 254, 256 may communicate with controller 350 as described with respect to plumbing controller 202 above, including by wireless transmission. Controller 350 may control governor 336, pump 316, and valve 338 as described with respect to governor 24, pump 17, and valve 102 above.

As an operator of nozzle 326 manipulates nozzle valve 327 or a lever of a valveless nozzle (not shown), the data indicating the position of nozzle valve 327 or lever, pressure, and/or flow rate is transmitted to controller 350. Controller 350 automatically adjusts the pressure of fire fighting fluid in hose 324 by either increasing the output of pump 316 or decreasing the output of pump 316. In one embodiment, a nozzle 326 may be set to a desired flow rate, the controller 350 may maintain the desired flow rate as variables change such as additional discharges being opened or closed. In addition, the nozzle operator may be given more control in situations where opening or closing the nozzle shut-off is directly linked to changing flow rate by way of the controller modulating engine RPM and adjusting valve positions.

Figure 11:
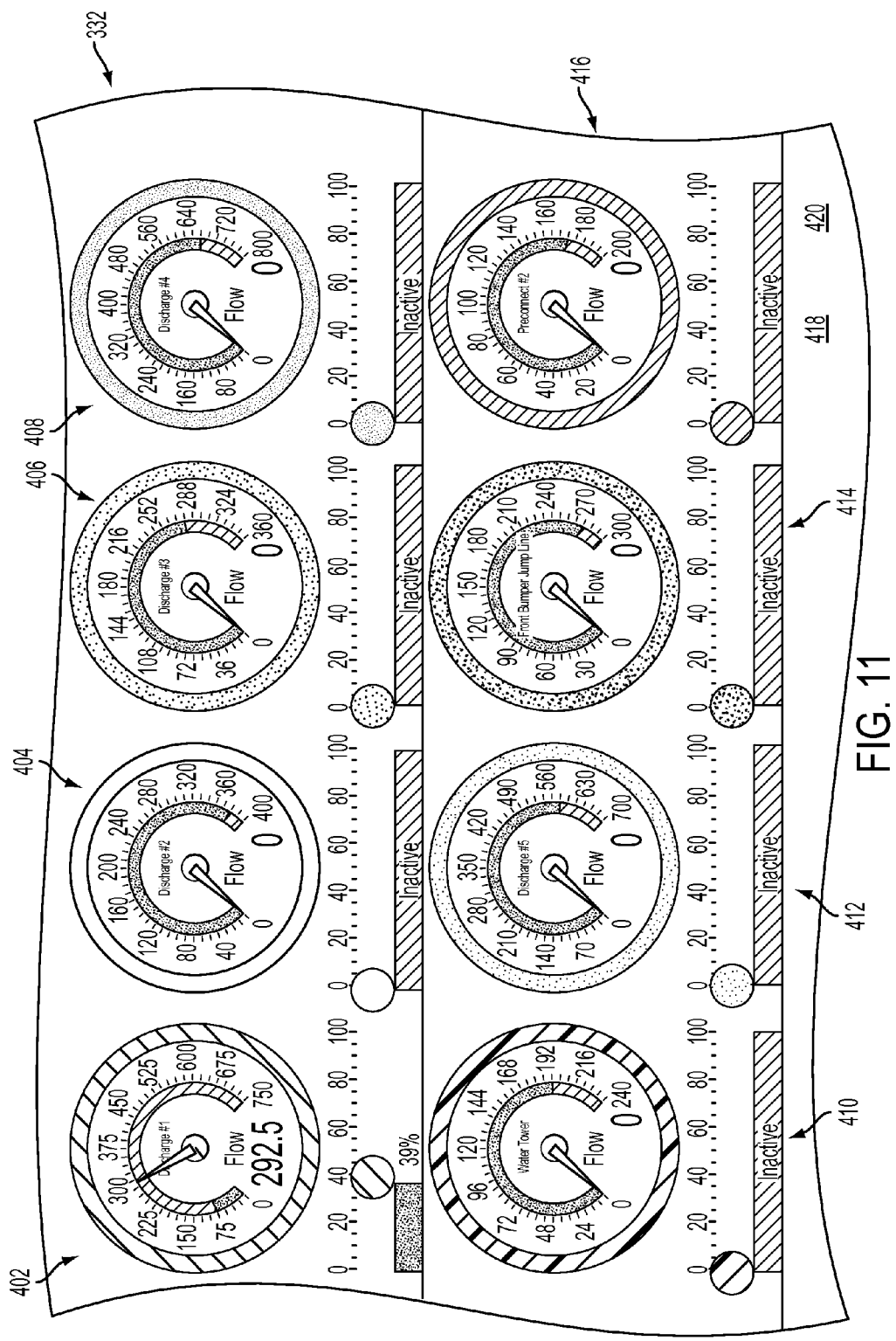
FIG. 11 illustrates a user display for an exemplary control system for the firefighting fluid delivery system of FIG. 8.

FIG. 11 illustrates an exemplary display 332 according to the present disclosure. Display 332 includes a plurality of valve displays 402, 404, 406, 408, 410, 412, 414, and 416. Each valve display corresponds to a different valve 338 of system 310. Illustratively, valve display 402 may correspond to valve 338 on first fluid outlet 322, valve display 404 may correlate to a valve 339 (see FIG. 8) on second fluid outlet 323 attached to monitor 328, and the remaining valve displays 406, 408, 410, 412, 414, and 416 correspond to valves on other fluid outlets.

Display 332 also includes engine display 418 for displaying information such as truck's engine speed (RPM), temperature, oil pressure, or the like. Data from a CAN bus output of governor 336 communicates with controller 350 and is displayed on display 332.

In one embodiment, display 332 also includes tank level display (not shown) for displaying information such as the level of fluid in one or more tanks 318, intake pressure in inlet 320, and the like. Data from a CAN bus output of tank 318 communicates with controller 350 and is displayed on display 332.

Data from additional modules, such as generators, scene lights, monitors, aerials, and ladders, may also be displayed.

Display 332 also includes warning display 420 for displaying any relevant warnings to an operator. Exemplary warnings include low pressure in the fluid inlet 320, low fluid level in tank 318, and warnings relating to additional requests for fluid as described below.

As illustrated in FIG. 11, display 332 incorporates data from multiple valves, the engine, and warning systems on a single screen. This allows a user to view data from multiple sources without having to scroll between screens or toggle through menus.

Figure 12:
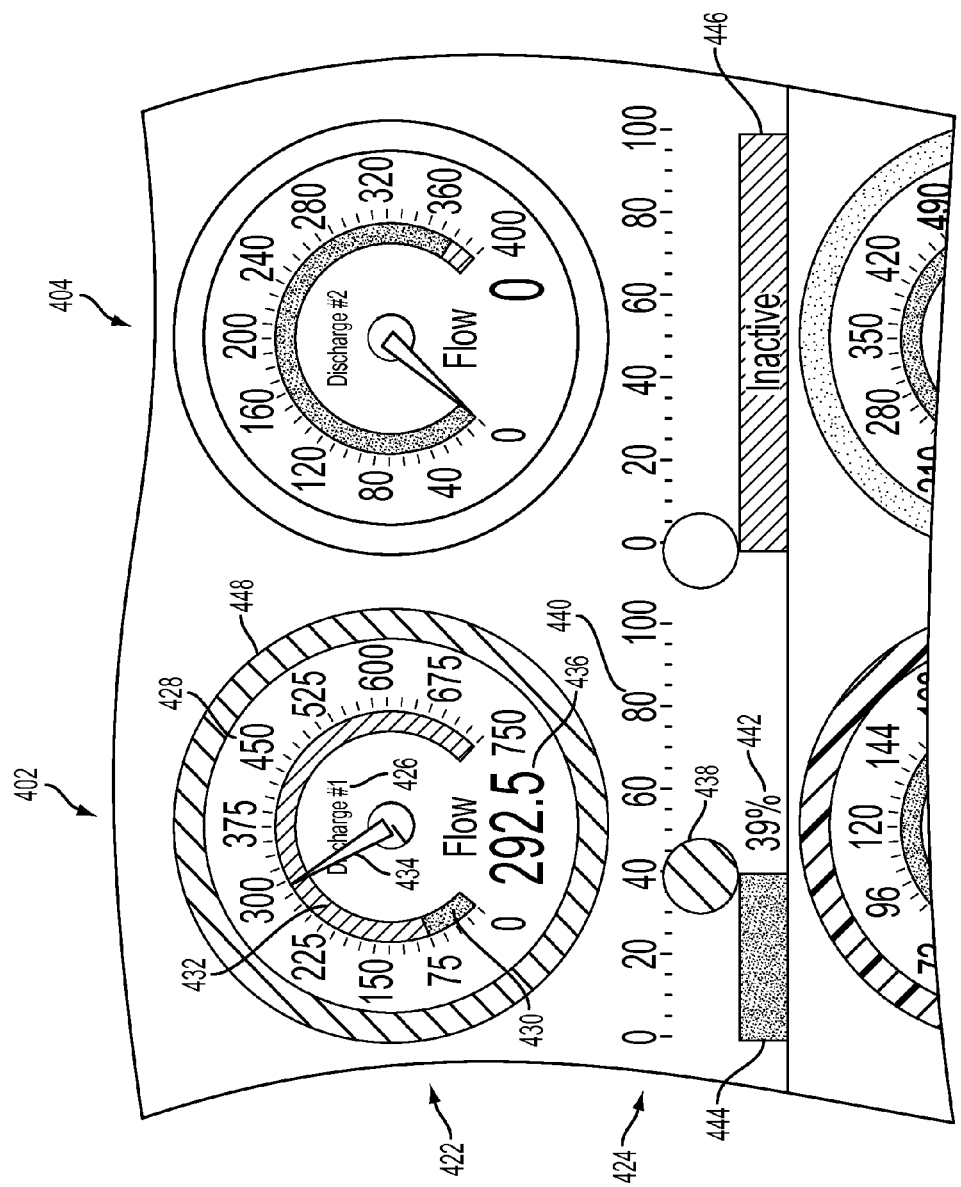
FIGS. 12 and 12A illustrate one portion of the user display of FIG. 11.

FIG. 12 illustrates an enlarged view of one of the valve displays 402 of FIG. 11. Valve display 402 comprises a flow portion 422 and a valve portion 424. Flow portion 422 displays information relating to the flow rate of fluid through valve 338 associated with valve display 402. Valve portion 424 displays information relating to the position of valve element, such as ball 342, within valve 338 associated with valve display 402.

Flow portion 422 includes identification 426. Identification 426 identifies which fluid outlet corresponds to the valve display 402. As illustrated in FIG. 12, valve display 402 corresponds to "Discharge #1." Flow portion 422 further includes reference display 428. Reference display 428 shows a range of possible flow rates possible through corresponding valve 338. As illustrated, reference display 428 displays a range of possible flow rates from 0 to 750 gallons per minute. As shown in FIG. 11, the range may vary between different valve displays, as different outlets may have different ranges of possible flow rates. For example, valve display 416 has a range of 0 to 200, and valve display 408 has a range of 0 to 1000. The flow rate may also be displayed in other units, such as liters per minute. In other embodiments, the flow rate is replaced with the pressure measured in pounds per square inch, kilopascals, bar, or other suitable units.

Figure 12A:
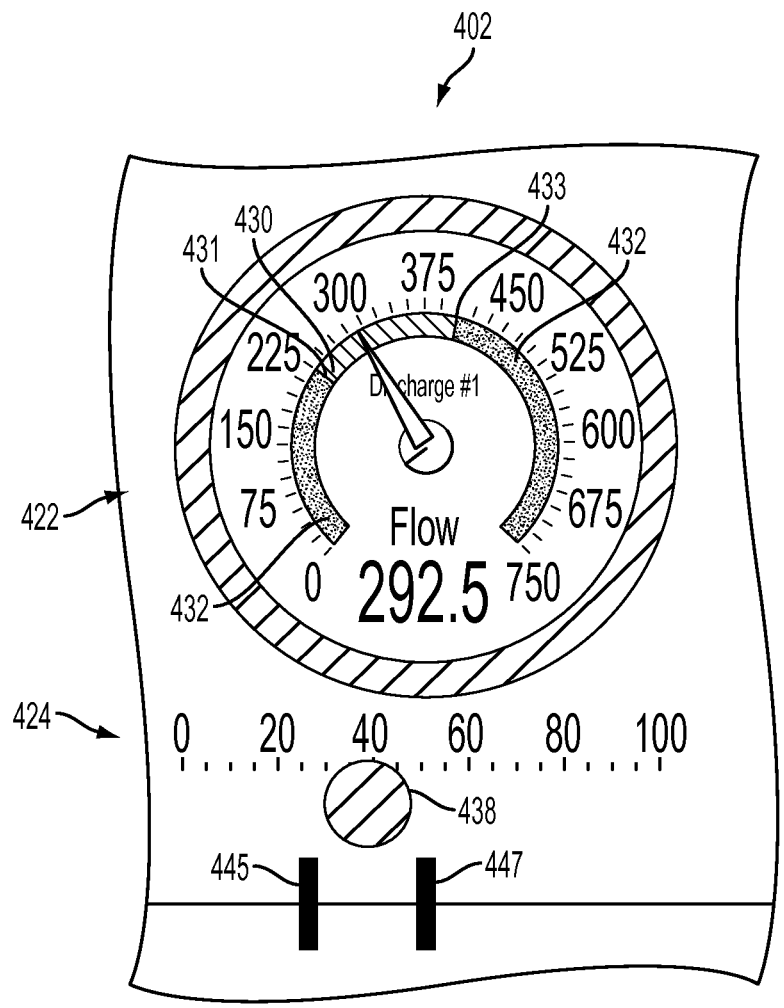

Referring again to valve display 402 in FIGS. 12 and 12A, reference display 428 is divided into first portion 430 and second portion 432. As illustrated, first portion 430 may be green in color, and second portion 432 may be red in color. In one exemplary embodiment, first portion 430 indicates operation within a safe range of discharges based on the current operations of the system. Second portion 432 indicates operating outside of a safe range of discharge based on the current operations of the system.

In another exemplary embodiment, first portion 430 indicates that the associated valve is operating within a range of predetermined characteristics and second portion 432 indicates that the associated valve is operating outside a range of predetermined characteristics. In this embodiment, an operator sets the range associated with first portion 430 based in part on known operating characteristics of the firefighting fluid delivery system 310. In one embodiment, these characteristics include a range of discharge pressures or flow rates determined to operate with minimal adjustments. The characteristics may be determined in part by the type or model of nozzle 326 and length of hose 324 associated with first valve 338. In another embodiment, a portion of valve display 402 changes color when first valve 338 is operating outside of the range of predetermined characteristics. In the embodiment illustrated in 12A, second portion 432 is discontinuous and bounds first portion 430 at a lower threshold 431 and an upper threshold 433. In one embodiment, reference display 428 is a manipulatable icon, and the range corresponding to first portion 430 can be adjusted by touching lower threshold 431 and/or upper threshold 433 on valve display 402 and dragging the threshold to a new value.

In one embodiment, controller 350 alerts an operator when the valve parameter is operating outside the predetermined characteristics as indicated by first portion 430. Exemplary alerts include a warning message on display 332, changing the color of a portion of display 332, an audible alert, or other suitable alerts.

Needle indicator 434 shows where on reference display 428 the current flow registers. Additionally, flow display 436 displays the current flow numerically.

Valve portion 424 includes set point indicator 438, reference indicia 440, valve position indicator 442, and valve position visual indicator 444. Set point indicator 438 indicates the current set point of corresponding valve 338. Reference indicia 440 provide visual cues that valve 338 is set to just below 40% open. Valve position indicator 442 indicates that the current status of valve 338, as measured by encoders 344, is 39% open. Valve position visual indicator 444 provides visual cues that valve 338 is currently about 40% open. If the valve is currently inactive, or another warning status occurs, valve position indicator 442 and valve position visual indicator 444 are replaced with status message 446, as shown in reference to valve display 404. As an example, if valve 338 does not reach the set point within a predetermined time, status message 446 will alert user that the valve is not in position.

In another embodiment illustrated in FIG. 12A, an acceptable range for each corresponding valve 338 is provided in place of a set point. In the illustrated embodiment, a minimum 445 and maximum 457 set point indicator are used to set the range on valve portion 424 of display 332. In another embodiment (not shown), the range is automatically set a certain distance above and below the setpoint indicator 438.

As illustrated in FIGS. 11, 12, 14, and 15, outer reference ring 448 and corresponding set point indicator 438 may be color coded in a different color for each of valve displays 402, 404, 406, 408, 410, 412, 414, and 416.

Referring next to FIG. 13, an exemplary valve 338 is illustrated. Ball 342 is shown in the position indicated in FIGS. 11 and 12, at about 39% open.

Figure 14:
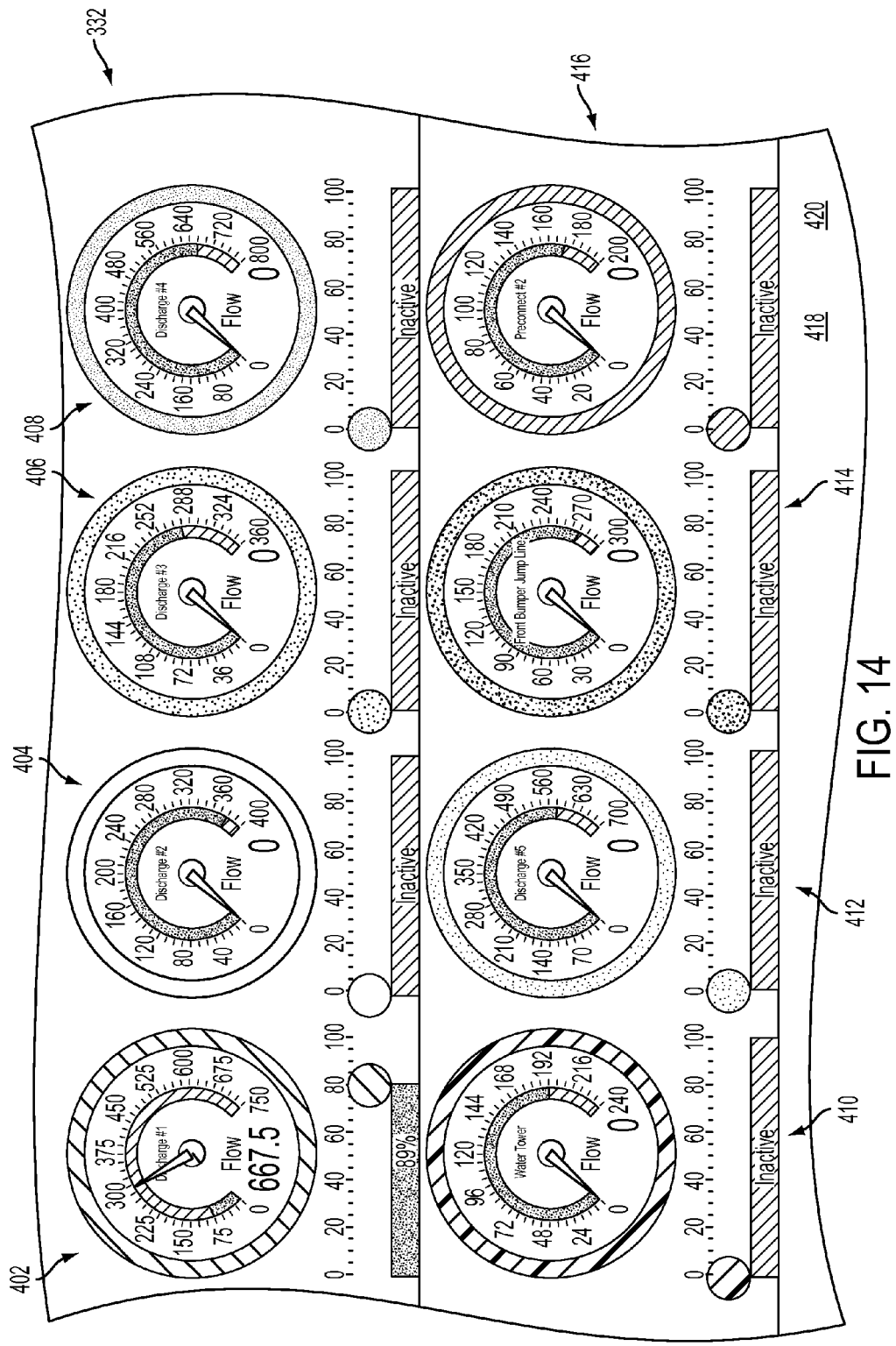
FIG. 14 illustrates the user display of FIG. 11 at a different valve position set point.
Figure 15:
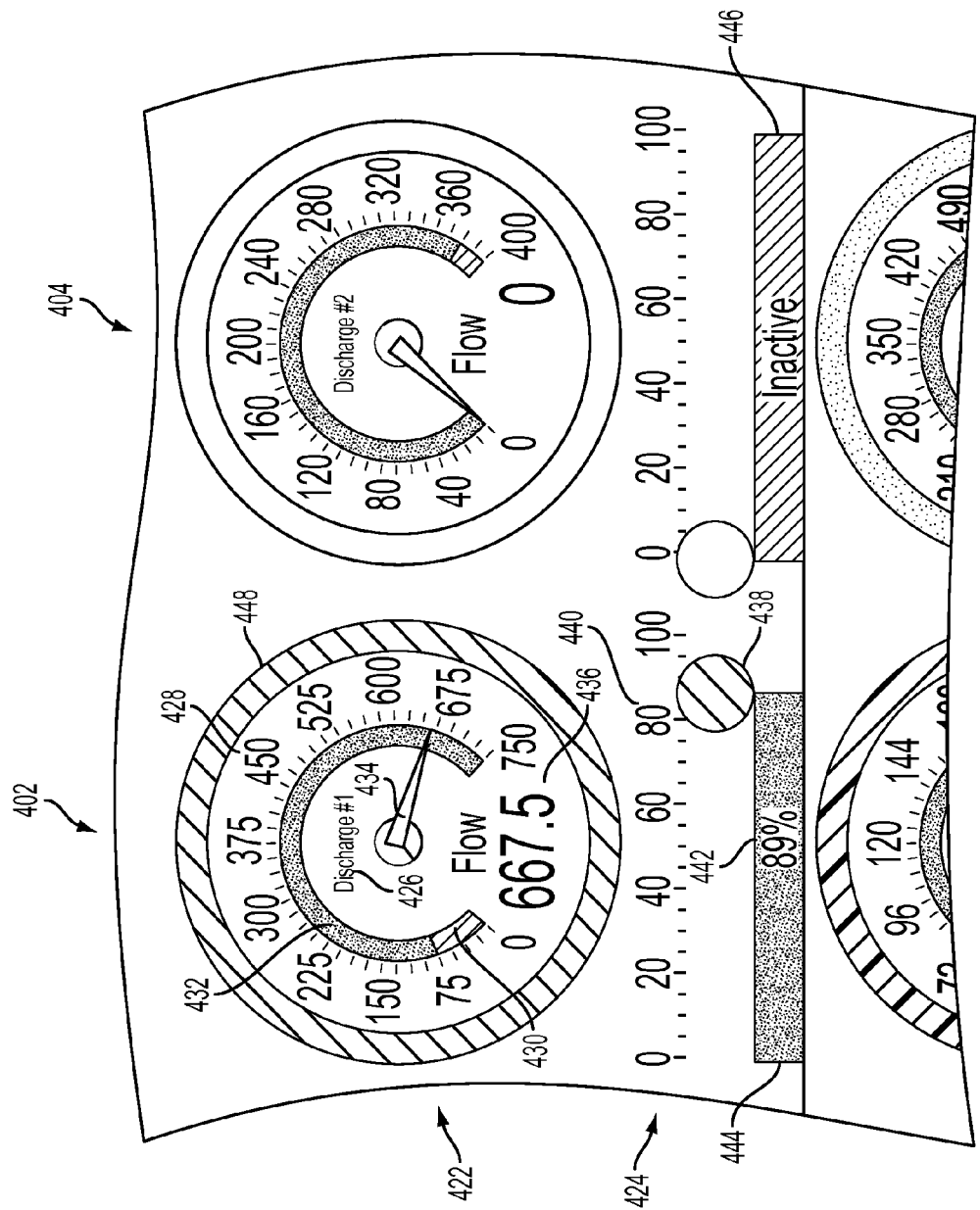
FIG. 15 illustrates one portion of the user displays of FIG. 14.

Referring next to FIGS. 14 and 15, the display 332 and valve display 402 are shown once a new set point has been entered for valve 338 corresponding to first fluid outlet 322. Display 332 comprises a touch screen with the icons being manipulatable by a user to form an input device to control system 330. An operator touches display 332 and drags set point indicator 438 to a new position. Controller 350 receives as indication of this from display 332 and in turn communicates to valve controller 346 the new set point. Valve controller 346 actuates valve 338 with motor 340. Encoder 344 provides an indication to valve controller 346 of the current configuration of valve 338. Valve controller 346 communicates the current position of valve 338 to controller 350, which displays it on display 332 valve position visual indicator 444. Similarly, a user may touch needle indicator 434 and drag it to a new position, and corresponding valve 338 and set point indicator 438 will adjust to reach the new flow rate set point.

In FIGS. 14 and 15, set point indicator 438 for valve display 402 has been moved to about 89%. Needle indicator 434 and flow display 436 have increased to display that the flow rate through corresponding valve 338 at 89% has increased to 667.5.

Referring next to FIG. 16, the exemplary valve 338 of FIG. 13 is illustrated with ball 342 is shown in the position indicated in FIGS. 14 and 15, at about 89% open.

Figure 18:
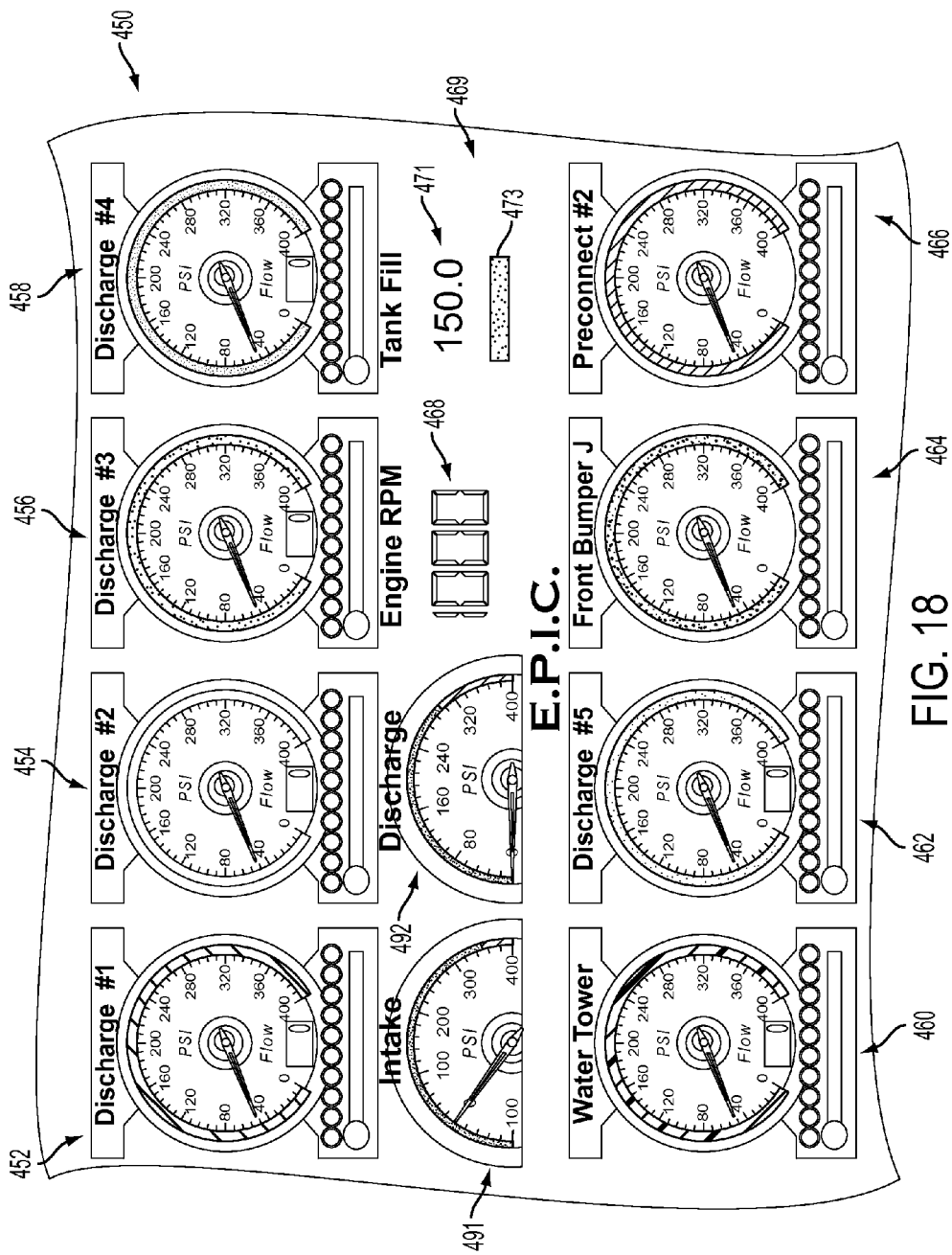
FIG. 18 illustrates another exemplary user display for a control system for the firefighting fluid delivery system of FIG. 8.

Referring next to FIG. 18, another exemplary display 450 according to the present disclosure is illustrated. Display 332 includes a plurality of valve displays 452, 454, 456, 458, 460, 462, 464, and 466. Each valve display corresponds to a different valve 338 of system 310. Illustratively, valve display 452 corresponds to valve 338 on first fluid outlet 322, valve display 454 may correlate to a valve 339 (see FIG. 8) on second fluid outlet 323 attached to monitor 328. Valve displays 456, 458, and 462 correspond to additional valves on additional pump discharge lines. Valve displays 460, 464, and 466 correspond to other valves on fire truck. In the embodiment illustrated in FIG. 18, valve display 460 corresponds to a valve on a water tower, an elevated fluid discharge (not shown in FIGS. 1 and 8). Valve display 464 corresponds to a valve on a front bumper jump line (not shown in FIGS. 1 and 8). Valve display 466 corresponds to a valve attached to a preconnect line, which is a line typically kept connected to the truck (not shown in FIGS. 1 and 8).

In the illustrated embodiment, display 450 also includes engine display 468 for displaying information such as truck's engine speed (RPM), temperature, oil pressure, or the like. As illustrated, engine display 468 displays the current engine speed. In one embodiment, data from a CAN bus output of governor 336 communicates with controller 350 and is displayed on display 450.

In the illustrated embodiment, display 450 also includes tank level display 469 for displaying information such as the level of fluid in one or more tanks 318, intake pressure in inlet 320, and the like. As illustrated, tank level display 469 includes a tank volume display 471 displaying the tank level in gallons, and tank percentage display 473 displaying a rectangle that has a length corresponding to the proportion of the tank volume currently filled. Data from a CAN bus output of tank 318 communicates with controller 350 and is displayed on display 450.

In the illustrated embodiment, display 450 also includes master intake display 491 and master discharge display 492 for displaying information relating to the intake and discharge pressures of pump 316.

Data from additional modules, such as generators, scene lights, monitors, aerials, and ladders, and display of relevant warnings to an operator may also be displayed on display 450.

As illustrated in FIG. 18, display 450 incorporates data from multiple valves, the engine, and warning systems on a single screen. This allows a user to view data from multiple sources without having to scroll between screens or toggle through menus. In another embodiment, display 450 incorporates data from multiple sources selected from a registry on a single screen. In an exemplary embodiment, the data displayed includes data from a plurality of the following sources: a first valve controller, a second valve controller, a monitor or water cannon, an engine, a governor, a water tank, a foam tank, a generator, and scene lighting. In one embodiment, the displayed data to be displayed on a single screen is selected by an operator, and display 450 automatically resizes the display outputs associated with each source to be displayed on a single screen.

Figure 19:
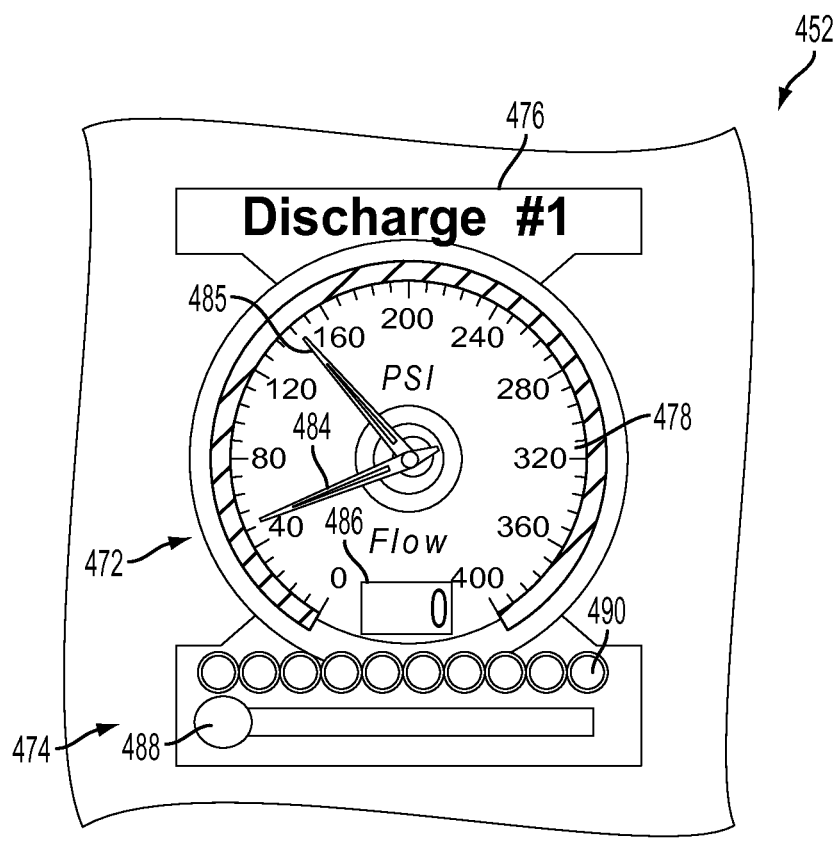
FIG. 19 illustrates one portion of the user displays of FIG. 18.

FIG. 19 illustrates an enlarged view of one of the valve displays 452 of FIG. 18. Valve display 452 comprises a flow portion 472 and a valve portion 474. Flow portion 472 displays information relating to the flow rate of fluid through valve 338 associated with valve display 452. Valve portion 474 displays information relating to the position of valve element, such as ball 342, within valve 338 associated with valve display 452.

Flow portion 472 includes identification 476. Identification 476 identifies which fluid outlet corresponds to the valve display 452. As illustrated in FIG. 19, valve display 452 corresponds to "Discharge #1." Flow portion 472 further includes reference display 478. Reference display 478 shows a range of possible pressures possible through corresponding valve 338. As illustrated, reference display 478 displays a range of possible pressures from 0 to 400 pounds per square inch. Needle indicator 484 indicates where on reference display 478 the current pressure registers. Additionally, flow display 486 displays the current flow rate in gallons per minute.

Valve portion 474 includes set point indicator 488 and valve status indicia 490. Set point indicator 488 indicates the current set point of corresponding valve 338. Valve status indicia 490 provide visual cues as to the current status of the valve. As illustrated, valve status indicia 490 includes ten markings, each corresponding to about 10% open status of the valve. As the corresponding valve 338 opens or closes, the ten markings comprising valve status indicia 490 change color. In one embodiment, the markings change from red to green to indicate the current status of the corresponding valve 338. When corresponding valve 338 is 0% open, all ten markings of valve status indicia are red. When corresponding valve 339 is 100% open, all ten markings of valve status indicia are green. When corresponding valve 339 is partially open, some of the ten markings are red and some of the markings are green. In an exemplary embodiment, each of the ten markings corresponds to 10% of the valve open position. When the valve is about 10% open, one marking is green and nine markings are red. When the valve is about 50% open, five markings are green and five markings are red. When the valve is about 90% open, nine markings are green and one marking is red.

In one embodiment, valve status indicia 490 gives a user manipulating set point indicator 488 a reference as to what percentage open the corresponding valve 338 is. When set point indicator 488 is aligned with the far left edge of valve status indicia 490, corresponding valve 338 is 0% open. When set point indicator 488 is aligned with the far right edge of valve status indicia 490, corresponding valve 338 is 100% open. When set point indicator 488 is at the mid-point of valve status indicia 490, corresponding valve 338 is 50% open. Although the illustrated valve status indicia 490 includes ten markings, more or fewer markings may also be used.

In an exemplary embodiment, valve status indicia 490 are positioned in line with set point indicator 488. Any difference between the change from green to red markings in valve status indicia 490 and set point indicator 488 indicates that the corresponding valve 338 is not at the set point.

In the illustrated embodiment, display 450 comprises a touch screen with the icons being manipulatable by a user to form an input device to control system 330. An operator touches display 452 and drags set point indicator 488 to a new position. Controller 350 receives as indication of this from display 450 and in turn communicates to valve controller 346 the new set point. Valve controller 346 actuates valve 338 with motor 340. Encoder 344 provides an indication to valve controller 346 of the current configuration of valve 338. Valve controller 346 communicates the current position of valve 338 to controller 350, which displays it on display 332 valve status indicia 490. Similarly, a user may touch setpoint needle 485 and drag it to a new position, and corresponding valve 338 and set point indicator 488 will adjust to reach the new flow rate set point.

In one embodiment (not shown), valve display 452 is an icon corresponding to a valve. In this embodiment, a operator touches the graphical representation of the valve and drags it to a new position corresponding to a valve position. First fluid outlet valve controller 346 and/or controller 350 adjust the position of first valve 338 to reach the valve position. In one exemplary embodiment, the graphical representation includes an illustration of a valve cross-section showing a waterway, and the operator touches and drags a portion of the graphical representation to cover a portion of the waterway. In another exemplary embodiment, the graphical representation includes an illustration of a valve and a valve handle, and an operator touches and drags the valve handle relative to the valve.

Referring again for FIG. 18, in one embodiment, display 450 includes a manipulatable icon for a monitor. Exemplary methods for controlling a monitor using a manipulatable icon are disclosed in U.S. patent application Ser. No. 12/174,866 entitled FIREFIGHTING DEVICE FEEDBACK CONTROL, filed Jul. 17, 2008, the disclosures of which are herein expressly incorporated by reference in their entirety. In one embodiment, an operator touches the manipulatable icon for monitor 328 and drags it to a new position corresponding to a position or orientation of at least a portion of the monitor 328. Controller 350 and/or monitor position controller 362 receives an indication of this from display 450 and in turns positions monitor 328 in a new position or new orientation of the at least portion of the monitor 328.

In one embodiment tank fill display 473 is a manipulatable icon. In this embodiment, an operator touches tank fill display 473 and drags the display 473 to a new position. Controller 350 receives an indication of this from display 450 and in turn adjusts the position of valves to fill tank 318 from fluid inlet 320. In another embodiment, display 450 includes a manipulatable icon (not shown) for generator 321 corresponding to the percentage or time remaining in a power source powering one or more systems on fire truck 312. In this embodiment, an operator touches the manipulatable icon for generator 321 and drags the icon to a new position corresponding to a higher percentage or time remaining in the power source. Controller 350 receives an indication of this from display 450 and in turn controls the generator 321 and engine 334 to charge the power source powering one or more systems. In one embodiment, display 450 includes a manipulatable icon (not shown) for scene lighting 319 corresponding to the position or orientation of scene lighting 319. In this embodiment, an operator touches the manipulatable icon for scene lighting 319 and drags the icon to a new position corresponding to a new position or a new orientation for scene lighting 319. Controller 350 and/or scene lighting controller 368 receives an indication of this from display 450 and in turns positions scene lighting 319 in a new position or new orientation.

Figure 20:
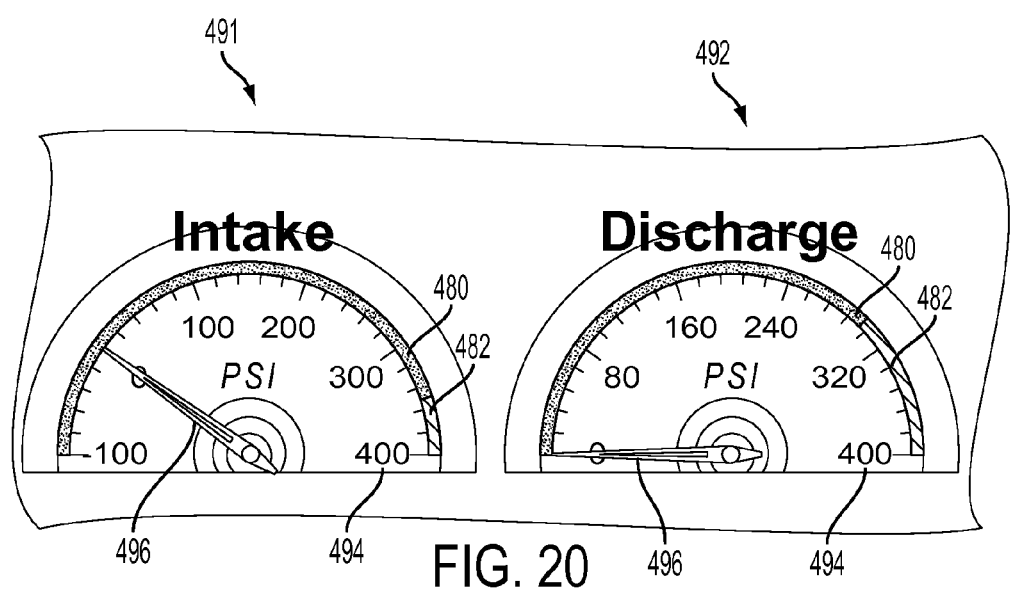
FIG. 20 illustrates another portion of the user displays of FIG. 18.

Referring next to FIG. 20, the exemplary master intake display 491 and master discharge display 492 of the display 450 of FIG. 18 are illustrated. Master intake display 491 displays information relating to the intake pressure of pump 316 and master discharge display 492 displays information relating to the discharge pressure of pump 316. Displays 490 and 492 include reference display 494 showing range of possible pressures through pump 316. As illustrated, reference display 494 for master intake display 491 displays a range of possible pressures from −100 to 400 pounds per square inch, and reference display 494 for master discharge display 492 displays a range of possible pressures from 0 to 400 pounds per square inch. A needle indicator 496 for each of displays 490, 492 indicates where on reference display 494 the current intake and discharge pressures register.

As illustrated, reference display 494 is divided into first portion 480 and second portion 482. As illustrated, first portion 480 may be green in color, and second portion 482 may be red in color. Other colors may also be used. First portion 480 indicates operation within a safe range of pressures. Second portion 482 indicates operating outside of a safe range of pressures to the system. In the exemplary embodiment illustrated, master intake display 491 changes from first portion 480 to second portion 482 at about 350 psi, and master discharge display 492 changes from first portion 480 to second portion 482 at about 300 psi.

In one embodiment, controller 350 receives an input from one or more analog devices coupled to controller 350 and displays the input as an icon as part of display 450.

Figure 17:
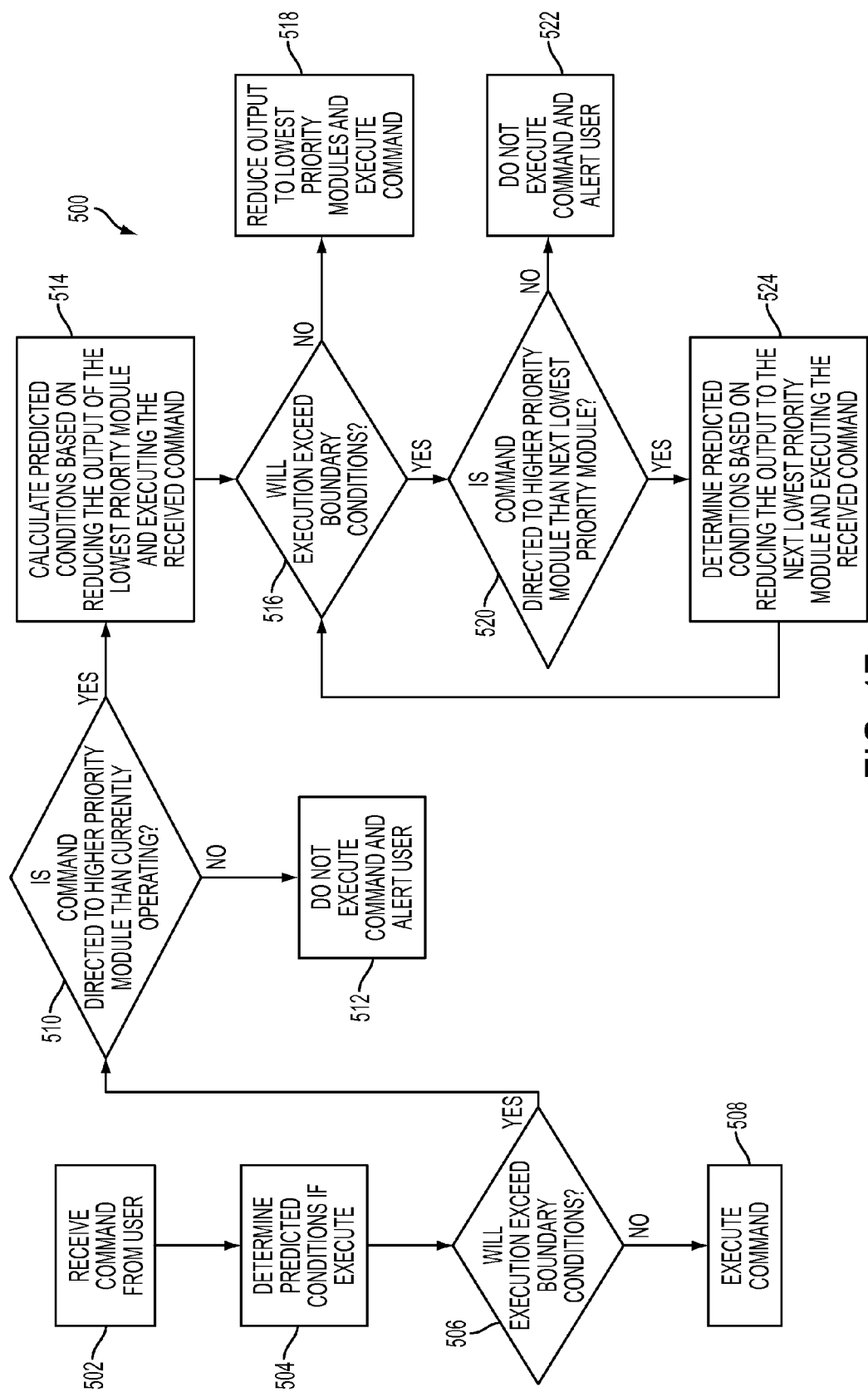
FIG. 17 illustrates an exemplary control sequence for a control system for the firefighting fluid delivery system of FIG. 8.

In one embodiment, as illustrated in FIG. 17, controller 350 executes a processing sequence 500 to determine whether a requested command from touch screen input 358 may be implemented prior to moving the valve. In block 502, a command is received by controller 350. The command may come from touch screen input 358 as part of display 332. In block 504, controller 350 determines predicted conditions if the command is executed. The predicted conditions may be based on information from sensors including sensors measuring tank level, pressure, and flow at different points in firefighting fluid delivery system 310. In one embodiment, the predicted conditions are based on information from pressure transducers and flow meters near nozzle 326. In one embodiment, the predicted conditions are based in part on the model or type of one or more nozzles 326 and the status of a valve associated with the one or more nozzles 326. In one embodiment, the predicted conditions are based in part on the model or type of monitor 328 and the inlet pressure and discharge pressure through the monitor 328.

In block 506, controller 350 compares the predicted conditions with boundary conditions stored in memory 354. Boundary conditions may consist of one or more monitored values. Exemplary boundary values relate to engine RPM, oil pressure, tank level, maximum flow rates, and maximum pressures. If the predicted conditions do not exceed the boundary conditions, in block 508, the controller executes the command.

If the predicted conditions exceed the boundary conditions, in block 510, controller 350 determines whether the newly received command from block is directed to a higher priority module than any module currently operating. Priority is determined by several predetermined criteria. In one embodiment, higher priority is given to manned modules, such as lines those attached to hose 324, over unmanned lines, such as to monitor 328. Higher priority may also be given to currently operating modules over newly started modules. If the command is not directed to a higher priority module than any currently operating, in block 512, the controller does not execute the command and alarms the user. Exemplary alarms include audio alarms and displaying an alarm on display 332, such as in warning display 420. In one embodiment, the priority of modules is determined by an operator. In another embodiment, a predetermined priority of modules is provided to controller 350.

If the command is directed to a higher priority module than at least one module currently operating, in block 514, controller 350 determines the predicted conditions based on reducing the output to the lowest priority module and executing the command received in block 502. The modules may be categorized based on different types of outputs, and the lowest priority module to have the output reduced may be selected from a category of modules affecting the boundary condition. For example, if the boundary condition at issue involves tank level, the selection of the lowest priority module in processing sequence 500 may be made only among those modules categorized as affecting tank level. Further, the amount of reduction may be to deactivate the lowest priority module altogether, or reduce it by a predetermined amount. If the partial reduction does not work, controller 350 may iteratively reduce the module again until either the module is deactivated or the boundary condition is no longer violated.

In block 516, controller 350 compares the predicted conditions of block 514 with the boundary conditions stored in memory 354. If the predicted conditions do not exceed the boundary conditions, in block 518, the controller 350 reduces the output to the lowest priority module and executes the command.

If the predicted conditions exceed the boundary conditions, in block 520, controller 350 determines whether the newly received command from block is directed to a higher priority module than any other module currently operating. If the command is not directed to a higher priority module than any currently operating, in block 522, the controller does not execute the command and alarms the user.

If the command is directed to a higher priority module than another module currently operating, in block 524, similarly to block 514, controller 350 determines the predicted conditions based on reducing the output to the next lowest priority module and executing the command received in block 502. The controller then returns to block 516 to compare the predicted conditions from block 524 with the boundary conditions.

Other suitable methods for determining whether to execute a command may also be used. In other embodiments, a new command that will exceed boundary conditions may be partially filled while similarly proportionally decreasing output to other modules with similar priority. In still other embodiments, controller will monitor boundary conditions as a new command is received and attempting to be implemented. If the status of an output reaches within a predetermined range of the boundary condition, the system will display an alarm and the command will not be further executed. Alternatively, the system may alarm and return to the status prior to the command that caused the alarm.

Figure 21:
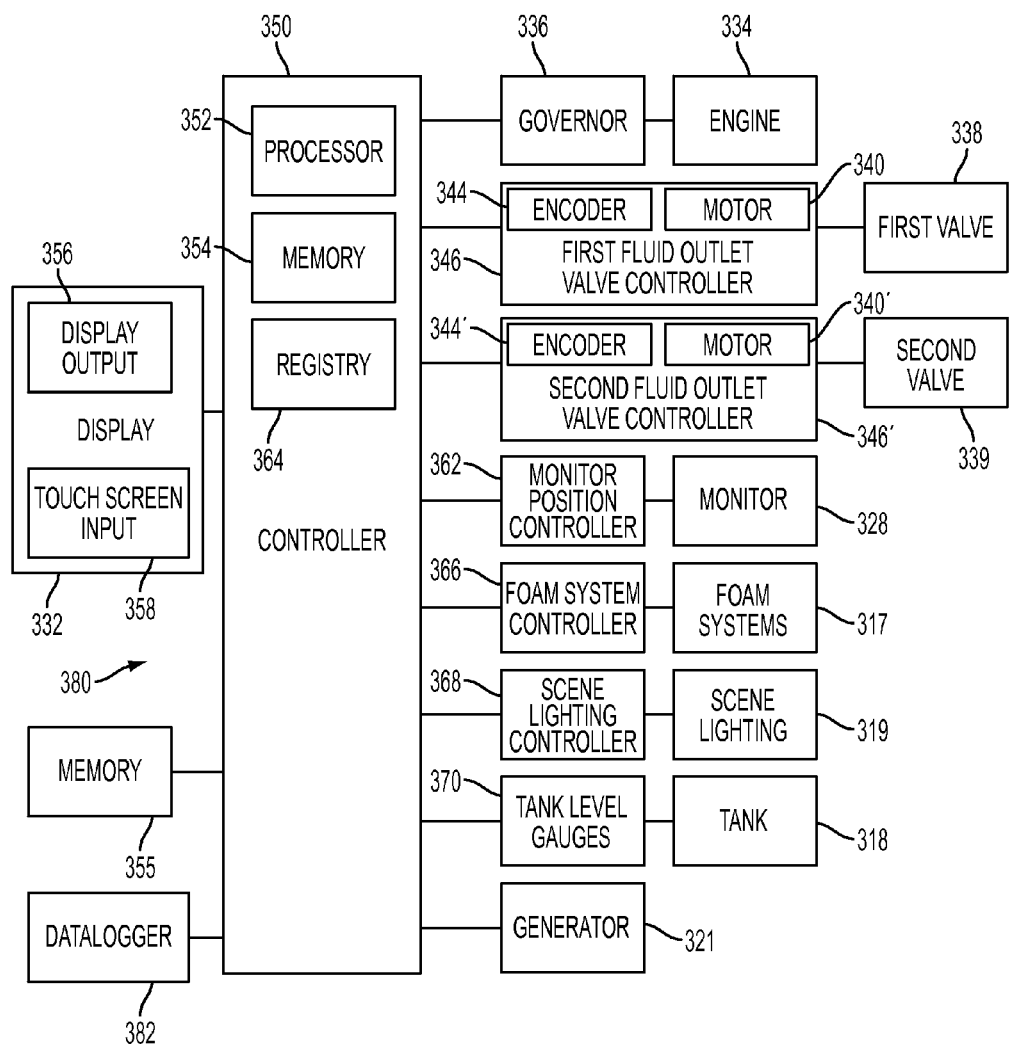
FIG. 21 illustrates another exemplary control system including a data logger according to the present disclosure.

Referring next to FIG. 21, another exemplary control system 380 is illustrated. Control system 380 is similar to control system 330, but further includes datalogger 382. Datalogger 382 records the status of external systems. Exemplary external systems are shown in FIG. 21, and include engine 334, valve controllers 346, 346', monitor controller 362, and other systems. In the exemplary embodiment illustrated in FIG. 10, controller 350 is operably connected with external systems, over a CAN bus network. In one embodiment, controller 350 sends commands to the external systems and receives status and feedback data back from the external systems over the CAN bus network. Datalogger may include memory to store the status and feedback data from the external systems, or datalogger may store the status and feedback data in memory 354 or external memory 355. In one embodiment, datalogger 382 is part of controller 350. In one embodiment, datalogger 382 is software executed by controller 350.

In one embodiment, the status and feedback data stored by datalogger 382 may be retrieved by an operator and examined to determine whether proper procedures were followed and whether the actions taken by an operator were correct. In another embodiment, datalogger 382 determines whether proper procedures were followed and whether actions taken were correct based on the fact that certain systems have higher priority than other systems. In this embodiment, datalogger 382 is provided with predetermined rules, criteria, or boundary conditions for a given range of conditions. If the status and feedback data stored by datalogger 382 violate these provided rules, criteria, or boundary conditions, an operator is alerted. In an exemplary embodiment, the operator is alerted as the rule, criteria, or boundary condition is violated. In another exemplary embodiment, the operator is alerted only upon requesting a report from control system 380.

Figure 22:
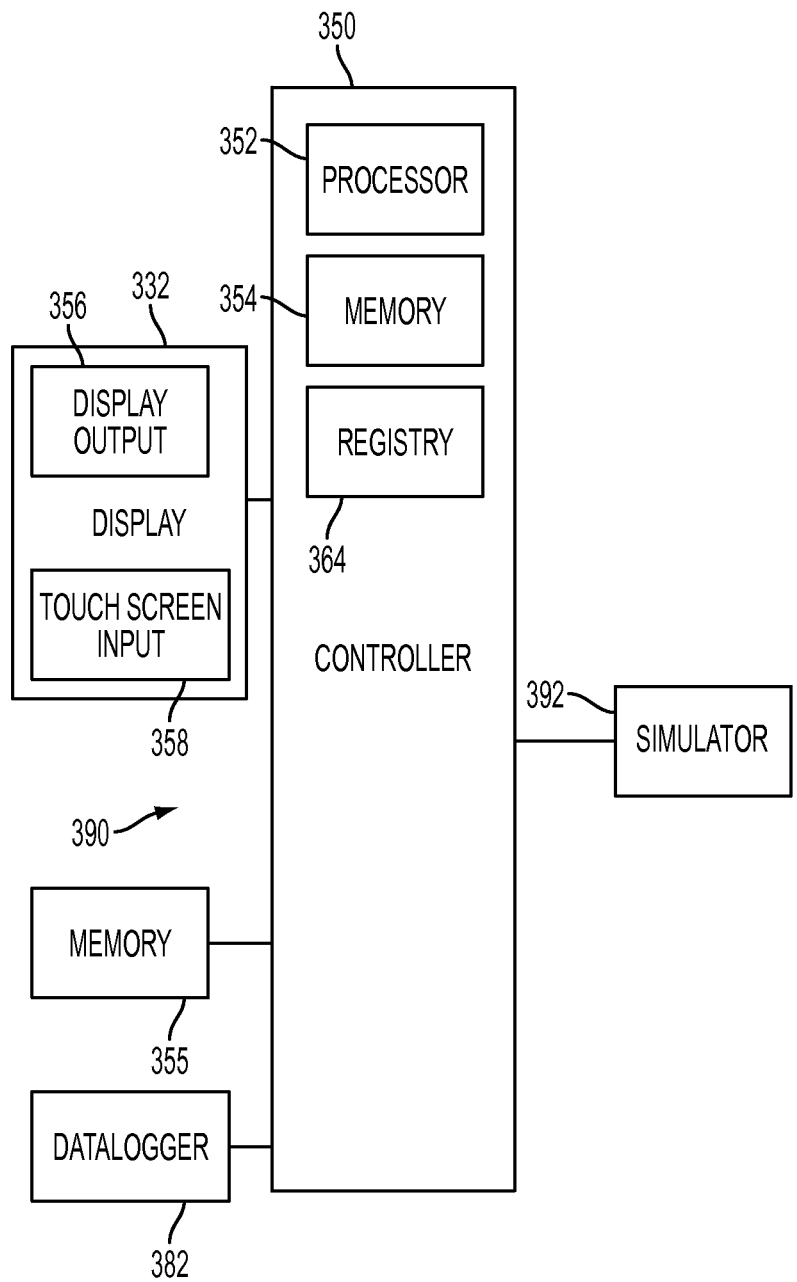
FIG. 22 illustrates an exemplary control system including a simulator according to the present disclosure.

Referring next to FIG. 22, still another exemplary control system 390 is illustrated. Control system 390 is similar to control system 380, but the external systems, such as engine 334, valves, valve controllers 346, 346', monitor controller 362, and other systems, are simulated with simulator 392. Display 332 displays to an operator one or more predetermined starting conditions provided from memory 354 or external memory 355 on display output 356. Display 332 includes information relating to valve status, pressures, flow rates, and warnings provided by simulator 392. Simulator 392 determines predicted output conditions of a firefighting fluid delivery system based on a given set of input conditions. The predicted conditions may be based on information gained from sensors associated with a non-simulated control system 380 including sensors measuring tank level, pressure, and flow at different points in firefighting fluid delivery system 310. In one embodiment, at least some of the output conditions are displayed on display output 356 and at least some of the input conditions can be set or adjusted through touch screen input 358. Exemplary output conditions include flow rates, pressures, engine conditions, tank levels, and other suitable outputs. Exemplary input conditions include valve status set point, flow rate set points, pressure set points, engine condition set points, and other suitable inputs. In one embodiment, simulator 392 is part of controller 350. In one embodiment, simulator 392 is software executed by controller 350.

FIG. 23A illustrates an exemplary simulation process 530 for control system 390. Referring to FIGS. 22 and 23A, in one embodiment, simulator 392 provides a simulation of a firefighting fluid delivery system 310 at a steady state condition, as shown in block 532. In block 534, display 332 displays the starting input conditions and output conditions on display output 356. In block 536, an operator can then adjust one or more of the input conditions using touch screen input 358 and in block 538 simulator 392 determines the effect on the output conditions. In block 540, datalogger 382 records the input and predicted output conditions in either memory 354 or external memory 355. In block 542, controller 350 determines whether to end the simulation. The decision to end the simulation may be based on a predetermined time, a boundary condition being exceeded, achieving a predetermined output, a testing interval ending, or other suitable logic. In one embodiment, the simulator provides simulated equipment failures or other alarm conditions to determine how an operator reacts to unplanned events. If the simulation is not ended, process 530 returns to block 534 and displays the current input and output conditions on display 332. In one embodiment, the record of input conditions and simulated output conditions can be reviewed to determine the predicted effects of changing different inputs. In another embodiment, control system 390 may be used as a training tool and the record of input conditions and simulated output conditions may be reviewed to determine whether proper procedures were followed and the operator's ability to achieve desired outputs.

FIG. 23B illustrates another exemplary simulation process 550 for control system 390. Referring to FIGS. 22 and 23B, in another embodiment simulator 392 provides a simulation of a firefighting fluid delivery system 310 to an operator, and then simulates an event. In block 552, starting conditions are entered into simulator 392 or retrieved from memory operable connected to simulator 392. In block 554, display 332 displays the starting input conditions and output conditions on display output 356. In block 556, simulator 392 receives conditions for an event. Exemplary events include changes in pressures or flow rates, simulated failures in system components, and other suitable events. In block 558, control system 390 determines the predicted effect on output conditions or an operator's response to the event. In block 560, the event conditions and predicted outputs are recorded in either memory 354 or external memory 355. In block 562, display 332 displays the current input conditions and output conditions on display output 356. In block 564, an operator adjusts one or more of the input conditions using touch screen input 358, and in block 566 simulator 392 determine the predicted effect on the output conditions. In block 568, datalogger 382 records the input and output conditions in either memory 354 or external memory 355. In block 570, controller 350 determines whether to end the simulation. The decision to end the simulation may be based on a predetermined time, a boundary condition being exceeded, achieving a predetermined output, or other suitable logic. If the simulation is not ended, process 550 returns to block 562 and displays the current input and output conditions on display 332. In one embodiment, the record of input conditions and simulated output conditions may be reviewed to determine the predicted effects of the event and the operator's response. In another embodiment, control system 390 may be used as a training tool and the record of input conditions and simulated output conditions can be reviewed to determine whether proper procedures were followed and the operator's ability to respond to the event.

In one embodiment, a fire fighting system is provided The fire system comprises a frame; a plurality of ground engaging members supporting the frame; a pump supported by the ground engaging members; a plurality of fluid valves supported by the ground engaging members and in fluid communication with the pump; a controller operatively coupled to the pump and the plurality of valves, the controller controlling a position of each of the plurality of valves; and a touch interface supported by the plurality of ground engaging members, the touch interface providing at least one input for setting a desired position of a first valve and at least one output indicating a current position of the first valve.

In one embodiment, a fire fighting system for use with a fire fighting vehicle including a frame; a plurality of ground engaging members supporting the frame; a pump supported by the ground engaging members; a plurality of fluid valves supported by the ground engaging members and in fluid communication with the pump is provided. The system comprises: a controller including at least one input for operatively coupling the controller to the pump and the plurality of valves, the controller being configured to control a position of each of the plurality of valves; and a touch interface, the touch interface providing at least one input for setting a desired position of a first valve and at least one output indicating a current position of the first valve.

In one embodiment, a control system for a pump module for a fluid delivery device including a frame; a plurality of ground engaging members supporting the frame; a pump supported by the ground engaging members; a plurality of fluid valves supported by the ground engaging members and in fluid communication with the pump is provided. The system comprises: a controller configured to operably connect over a network to a first valve controller controlling a status of a first valve in response to an input from the controller, a second valve controlling a status of a second valve in response to an input from the controller, and a governor operably controlling a power source in response to an input from the controller; and a display operably connected to the controller, the display configured to display the status of the first and second valves and configured to receive an input from a user; wherein the display includes a touchscreen monitor generating a manipulatable icon, the manipulation of the icon generating the input from the controller to the first valve controller.

In one embodiment, a control system for a pump module for a fluid delivery device including a frame; a plurality of ground engaging members supporting the frame; a pump supported by the ground engaging members; a plurality of fluid valves supported by the ground engaging members and in fluid communication with the pump is provided. The system comprises a controller configured to operably connect over a network to a first valve controller controlling a status of a first valve in response to an input signal from the controller; and a display including a touchscreen monitor for displaying the status of the first valve and configured to receive an input from a user, the display generating a manipulatable set point icon, wherein the configuration of the icon indicating the set point of the status of the first valve, and the display generating an input signal to the first valve controller in response to a manipulation of the set point icon. In another embodiment, the first valve controller further includes a sensor detecting a current status of the first valve and the display further generates a second icon indicating the current status of the first valve.

In one embodiment, a method of determining whether to execute a command in a control system for a pump module for a fluid delivery system operating a plurality of modules, the fluid delivery system including a frame; a plurality of ground engaging members supporting the frame; a pump supported by the ground engaging members; a plurality of fluid valves supported by the ground engaging members and in fluid communication with the pump is provided. The method comprises the steps of: providing a boundary condition; receiving a command to execute; determining if executing the command will violate the boundary condition and executing the command when executing the command will not violate the boundary condition; providing a priority ranking for each module and determining if the command is directed to a higher priority module than the priority of an operating module; determining not to execute the command when the command is not directed to a higher priority module than the operating module; and reducing the output of the operating module prior to executing the command when the command is directed to a higher priority module than the lowest priority operating module.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of determining whether to execute a command in a control system for a pump module for a fluid delivery system operating a plurality of modules, the fluid delivery system including a frame; a plurality of ground engaging members supporting the frame; a pump supported by the ground engaging members; a plurality of fluid valves supported by the ground engaging members and in fluid communication with the pump, the method comprising:
    providing a boundary condition;
    providing a priority ranking for each module of the plurality of modules, wherein modules associated with manned systems are given higher priority than modules associated with unmanned systems;
    receiving a command to execute;
    determining if executing the command will violate the boundary condition;
    executing the command if determined that executing the command will not violate the boundary condition; and
    if determined that executing the command will violate the boundary condition,
        determining if the command is directed to a higher priority module than a priority of an operating module;
        determining not to execute the command when the command is directed to a lower priority module than the operating module; and
        reducing an output of the operating module prior to executing the command when the command is directed to the higher priority module than the operating module.

2. The method of claim 1, wherein the boundary condition is selected from one of a discharge pressure, an intake pressure, a flow rate, an engine RPM, an engine oil pressure, and a fluid tank level.

3. The method of claim 1, further comprising the steps of:
    controlling a pressure generated by the pump and a position of the plurality of valves; and
    maintaining a first flow rate through a first valve of the fluid delivery system.

4. The method of claim 1, wherein the fluid delivery device is a fire truck.

5. A method of determining whether to execute a command in a control system for a pump module for a fluid delivery system operating a plurality of modules, the fluid delivery system including a frame; a plurality of ground engaging members supporting the frame; a pump supported by the ground engaging members; a plurality of fluid valves supported by the ground engaging members and in fluid communication with the pump, the method comprising:
    providing a boundary condition;
    providing a priority ranking for each module;
    receiving a command to execute;
    determining if executing the command will violate the boundary condition;
    executing the command if determined that executing the command will not violate the boundary condition; and
    if determined that executing the command will violate the boundary condition,
        determining if the command is directed to a higher priority module than a priority of a first operating module;
        determining not to execute the command when the command is directed to a lower priority module than the first operating module;
        reducing an output of the first operating module prior to executing the command when the command is directed to the higher priority module than the first operating module:
        determining if executing the command is directed to a higher priority module than a priority of a second operating module; and reducing an output of the second operating module prior to executing the command when the command is directed to the higher priority module than the second operating module.

6. The method of claim 5, wherein modules associated with manned systems are given higher priority than modules associated with unmanned systems.

7. The method of claim 5, wherein already operating modules are given higher priority than newly started modules.

8. A method of determining whether to execute a command in a control system for a pump module for a fluid delivery system operating a plurality of modules, the fluid delivery system including a frame; a plurality of ground engaging members supporting the frame; a pump supported by the ground engaging members; a plurality of fluid valves supported by the ground engaging members and in fluid communication with the pump, the method comprising:
provifing a boundary condition;
providing a priority ranking for each module;
receiving a command to execute;
determining if executing the command will violate the boundary condition;
executing the command if determined that executing the command will not violate the boundary condition; and
if determined that executing the command will violate the boundary condition,
determining if the command is directed to a higher priority module than a priority of a first operating module;
determining not to execute the command when the command is directed to a lower priority module than the first operating module;
reducing an output of the first operating module prior to executing the command when the command is directed to the higher priority module than the first operating module;
determining if executing the command is directed to a higher priority module than
a priority of a second operating module; and
reducing an output of the second operating module prior to executing the command when the command is directed to the higher priority module than the second operating module wherein the output of the first operating module and second operating module are equally reduced when the command is directed to the higher priority module than the first and second operating modules.

9. The method of claim 8, wherein already operating modules are given higher priority than newly started modules.

10. The method of claim 8, wherein the priority ranking is provided by an operator.

11. A method of determining whether to execute a command in a control system for a pump module for a fluid delivery system operating a plurality of modules, the fluid delivery system including a frame; a plurality of ground engaging members supporting the frame; a pump supported by the ground engaging members; a plurality of fluid valves supported by the ground engaging members and in fluid communication with the pump, the method comprising:
providing a boundary condition;
providing a priority ranking for each module;
receiving a command to execute;
determining if executing the command will violate the boundary condition;
executing the command if determined that executing the command will not violate the boundary condition;
if determined that executing the command will violate the boundary condition,
determining if the command is directed to a higher priority module than a priority of an operating module;
determining not to execute the command when the command is directed to a lower priority module than the operating module; and
reducing an output of the operating module prior to executing the command when the command is directed to the higher priority module than the operating module;
controlling a pressure generated by the pump and a position of the plurality of valves; and
maintaining a first flow rate through a first valve of the fluid delivery system wherein maintaining the first flow rate through the first valve of the fluid delivery system includes the steps of:
providing a first flow rate of a fluid pressurized by the pump through the first valve;
receiving at a controller a request for a second flow rate of the fluid through a second valve;
determining with the controller a predicted effect on the first flow rate based on request;
adjusting at least one of the position of the first valve and the pressure generated by the pump to maintain the first flow rate based on the predicted effect; and
adjusting the position of the second valve to provide the second flow rate of the fluid through the second valve.

12. The method of claim 11, further comprising the steps of:
displaying on a touchscreen display a status of the first valve;
displaying on the touchscreen display a manipulatable icon;
receiving a manipulation of the icon; and
controlling the status of the first valve based on the manipulation.

13. The method of claim 12, further comprising the steps of:
displaying on the touchscreen display a second manipulatable icon;
receiving a second manipulation of the second icon; and
controlling a status of the second valve based on the second manipulation.

14. The method of claim 13, further comprising the steps of:
controlling a power source of the fluid delivery system; and
adjusting at least one of the group consisting of the first valve and the power source to maintain one of a pressure and a flow rate through the first valve in response to the second manipulation of the second icon.

15. The method of claim 12, further comprising the steps of:
displaying a list of outputs on a single display screen of the touchscreen display from a plurality of systems including a first valve controller, a second valve controller, a monitor, a water cannon, an engine, a governor, a water tank, a foam tank, a generator, a ladder, an aerial, and a scene lighting system;
selecting a portion of outputs from the list of outputs displayed on the touchscreen display; and
automatically configuring a size of the portion of outputs to fit on the single display screen.

16. The method of claim 12, further comprising the steps of:
detecting a current status of the first valve; and displaying a second icon indicating the current status of the first valve.

17. The method of claim 12, wherein the manipulatable icon is graphical representation of the first valve.

18. The method of claim 12, further comprising the steps of:
    displaying a power source manipulatable icon on the touchscreen display; and
    controlling a governor associated with a power source based on a manipulation of the power source manipulatable icon.

19. The method of claim 12, further comprising the steps of:
    determining a fluid volume in a fluid tank; and
    displaying a fluid tank icon on the touchscreen display which indicates the fluid volume in the fluid tank.

20. The method of claim 19, wherein the fluid tank icon is a manipulatable fluid tank icon, the method further comprising the steps of:
    receiving a manipulation of the fluid tank icon; and
    controlling a valve in fluid communication with a fluid source and with the fluid tank to fill the fluid tank with fluid based on the manipulation of the fluid tank icon.

21. The method of claim 12, further comprising the steps of:
    displaying a current value of a parameter of the fluid delivery system;
    displaying a manipulatable first threshold icon corresponding to a first threshold value associated with the parameter; and
    receiving a manipulation of the first threshold icon to adjust the first threshold value.

22. The method of claim 21, further comprising the steps of:
    displaying an alert when the current value of the parameter crosses the first threshold value.

* * * * *